(12) United States Patent
Wu et al.

(10) Patent No.: US 12,508,259 B2
(45) Date of Patent: Dec. 30, 2025

(54) PHARMACEUTICAL FORMULATIONS CONTAINING NALBUPHINE

(71) Applicant: Humanwell Pharmaceutical US, Inc., Ballwin, MO (US)

(72) Inventors: Xueming Wu, Ballwin, MO (US); Jun Yang, Ballwin, MO (US); Baohua Yue, Ballwin, MO (US); Renhe Qiu, Ballwin, MO (US); Hong Du, Ballwin, MO (US)

(73) Assignees: Humanwell Pharmaceutical US, Inc., Ballwin, MO (US); Yichang Humanwell Pharmaceutical Co., Ltd., Yichang (CN)

( * ) Notice: Subject to any disclaimer, the term of this patent is extended or adjusted under 35 U.S.C. 154(b) by 192 days.

(21) Appl. No.: 18/163,171

(22) Filed: Feb. 1, 2023

(65) Prior Publication Data

US 2023/0255956 A1    Aug. 17, 2023

Related U.S. Application Data

(60) Provisional application No. 63/305,362, filed on Feb. 1, 2022.

(51) Int. Cl.
| | |
|---|---|
| *A61K 31/485* | (2006.01) |
| *A61K 9/00* | (2006.01) |
| *A61K 9/08* | (2006.01) |
| *A61K 31/439* | (2006.01) |
| *A61K 47/10* | (2017.01) |
| *A61K 47/12* | (2006.01) |
| *A61K 47/18* | (2017.01) |
| *A61K 47/26* | (2006.01) |
| *A61K 47/38* | (2006.01) |

(52) U.S. Cl.
CPC .......... *A61K 31/485* (2013.01); *A61K 9/0043* (2013.01); *A61K 9/08* (2013.01); *A61K 31/439* (2013.01); *A61K 47/10* (2013.01); *A61K 47/12* (2013.01); *A61K 47/183* (2013.01); *A61K 47/186* (2013.01); *A61K 47/26* (2013.01); *A61K 47/38* (2013.01)

(58) Field of Classification Search
None
See application file for complete search history.

(56) References Cited

U.S. PATENT DOCUMENTS

| | | | |
|---|---|---|---|
| 4,464,378 A * | 8/1984 | Hussain | A61K 31/485 |
| | | | 546/61 |
| 5,756,745 A | 5/1998 | Kavka | |
| 10,525,134 B2 | 1/2020 | Yacoby-Zeevi et al. | |

| | | | |
|---|---|---|---|
| 2007/0093517 A1 | 4/2007 | Newton | |
| 2017/0348224 A1 | 12/2017 | Hariharan | |
| 2018/0125840 A1 | 5/2018 | Sciascia et al. | |

FOREIGN PATENT DOCUMENTS

| | | | |
|---|---|---|---|
| RU | 2483731 C1 * | 6/2013 | |
| WO | 2022038403 A1 | 2/2022 | |

OTHER PUBLICATIONS

Pfiffner et al. 2019 DOI: 10.1136/archdischild-2019-esdppp. 116 (Year: 2019).*
Harnett, M. et al. Anesthesia & Analgesia 107(1):p. 344, 2008, DOI: 10.1213/ane.0b013e3181771097 (Year: 2008).*
Pfiffner et al. et al. Arch Dis Child 2019, 116 (Year: 2019).*
Harnett, M. et al. Anesthesia & Analgesia 107(1):p. 344, 2008 (Year: 2008).*
Pfiffner et al. 10.1136/archdischild-2019-esdppp.116; 2019 (Year: 2019).*
Grassin-Delyle, Intranasal drug delivery: An efficient and non-invasive route for systemic administration Focus on opioids, Pharmacology & Therapeutics, 2012, vol. 134, pp. 366-379.
Khanna, Intranasal Nalbuphine Formulation for Faster Management of Pain in Prehospital Scenario; Its Safety and Comparative Efficacy in Animal Models, Indian Journal of Pharmaceutical Education and Research, Apr.-Jun. 2020, vol. 54, Issue 2, pp. 310-322.
Khanna, Intranasal solid lipid nanoparticles for management of pain: A full factorial design approach, characterization & Gamma Scintigraphy, Chemistry and Physics of Lipids, Feb. 11, 2021, vol. 236, 13 pp.
Pietsch, Nasal nalbuphine analgesia in prehospital trauma managed by first-responder personnel on ski slopes inSwitzerland: an observational cohort study, Scandinavian Journal of Trauma, Resuscitation and Emergency Medicine, 2021, pp. 29-36.
Pfiffner, Pharmacokinetics of Intravenous and Intransasal Nalbuphine in Infants, Arch Dis Child, 10.1136, May 17, 2019, http://adc.bjj.com, 1 pg.
International Search Report and Written Opinion for PCT Application No. PCT/US2023/061790, mailed on Aug. 11, 2023, 23 pages.
Wang, et al., "Development and in vivo evaluation of intranasal formulations of parathyroid hormone (1-34)," 2021, vol. 28, No. 1, 487-498 (12 pages).

* cited by examiner

*Primary Examiner* — Clinton A Brooks
*Assistant Examiner* — Nicola Maria Bauer
(74) *Attorney, Agent, or Firm* — FLOREK & ENDRES PLLC

(57) ABSTRACT

Described herein are new pharmaceutical formulations, their preparation, and their use for pain treatment. In particular, described herein are pharmaceutical formulations of the analgesic drug Nalbuphine for intranasal administration.

20 Claims, 3 Drawing Sheets
(3 of 3 Drawing Sheet(s) Filed in Color)

PHARMACEUTICAL FORMULATIONS CONTAINING NALBUPHINE

CROSS-REFERENCE TO RELATED APPLICATIONS

This application claims priority to U.S. Provisional Application No. 63/305,362 entitled "PHARMACEUTICAL FORMULATIONS CONTAINING NALBUPHINE", filed Feb. 1, 2022, the entire contents of which are incorporated by reference herein.

FIELD OF THE DISCLOSURE

The present invention relates to new pharmaceutical formulations, their preparation, and their use for pain management. In particular, the present invention relates to pharmaceutical formulations of the analgesic drug Nalbuphine for nasal applications.

BACKGROUND

Pain is a very common disorder and is one of the symptoms for which therapeutic treatment is most frequently given. Millions of individuals suffer continually from recurrent pain without receiving treatment that is fully satisfactory in terms of improvement in symptoms. Morphine derivatives have been widely used in the past to treat pain and their use has been substantially increased over the last ten years.

Nalbuphine is a mixed agonist/antagonist opioid modulator. Specifically, it acts as a moderate-efficacy partial agonist or antagonist of the µ-opioid receptor (MOR) and as a high-efficacy partial agonist of the κ-opioid receptor (KOR), whereas it has relatively low affinity for the δ-opioid receptor (DOR) and sigma receptors. Its analgesic activity is equivalent to that of morphine and ten times greater than the activity of pentazocine.

The onset of action of nalbuphine occurs within 2 to 3 minutes after intravenous administration, and in less than 15 minutes following subcutaneous or intramuscular injection. An important advantage of nalbuphine over other pure MOR agonist opioid analgesic drugs is the "ceiling effect" on respiration (but no ceiling on the analgesic effect). Nalbuphine has limited ability to depress respiratory function. Another advantage is that nalbuphine users have lower instances of addiction as compared with other opiate derivatives. Nalbuphine is notably less euphorogenic and very likely to precipitate withdrawal in mu-opioid dependent subjects.

With the above properties nalbuphine is effectively an ideal analgesic: quick-acting, intense action, scarce inhibitor effect on the cardiovascular system and respiratory system, and no addictogenic effect.

However, while nalbuphine is well absorbed via intravenous routes (IV), absorption via an oral route is low and variable owing to strong first-pass metabolism in the liver. Therefore, only parental dosage forms: intravenous injection, intramuscular injection, and subcutaneous injection are currently available. The dosing interval of nalbuphine injection is approximately every three to six hours and must be used in the hospital or clinical settings to achieve analgesia. Additionally, the injection dosage forms have poor patient compliance.

The nasal route of drug delivery can afford rapid onset of action and convenience to patients and/or caregivers. In particular, this route may provide rapid absorption of drugs into the blood circulation. In some cases, absorption of almost the whole dose may be achieved and the pharmacokinetics may be similar to intravenous administration. Such rapid and effective drug delivery can be useful in the treatment of crisis situations such as pain, including breakthrough pain, headache, and migraine (Grassin-Delyle et al. Pharmacology & Therapeutics. 134 (3): 366-379).

It has been reported that Nalbuphine is rapidly and well absorbed from the nasal cavity (Pfiffner et al. Arch Dis Child. 104(6): e49, 2019). In addition, the effectiveness of intranasal Nalbuphine in providing analgesia in animals and patients has been demonstrated in a number of studies (for example Khanna et al., Chem Phys Lipids. 236:105060, 2021; Khanna et al., Indian J. Pharm. Educ. Res. 54(2): 310-322, 2020; Pietsch et al. Scandinavian Journal of Trauma, Resuscitation and Emergency Medicine 29:36, 2021). In all of these studies the intranasal administration of Nalbuphine appears to have been achieved by dropping or spraying either a commercially available injection formulation (Nubain) or complex nanoparticle formulation into the subject's nose.

However, the commercially available injection formulation of Nalbuphine contains 10 mg/mL of Nalbuphine hydrochloride and necessitates the intranasal administration of a large volume of liquid in order to provide a therapeutically effective dose of drug (1 mL or more per nostril for a normal adult) (Pietsch et al. Scandinavian Journal of Trauma, Resuscitation and Emergency Medicine 29:36, 2021). Due to the low solubility of commercially available Nalbuphine hydrochloride (approximately 30 mg/mL), it is not possible to achieve therapeutic levels at 0.1 mL/nostril nasal spray.

Consequently, the therapeutic utility of Nalbuphine through nasal route or other non-injection routes is hampered by technical problems as listed above, and millions of people continue to suffer from pain due to the lack of adequate treatment options.

SUMMARY OF DISCLOSURE

One embodiment of the present disclosure, described herein, is a pharmaceutical composition for intranasal administration comprising nalbuphine or a salt thereof and an acidifying agent selected from a group consisting of sulfuric acid, methanesulfonic acid, nitric acid, formic acid, acetic acid, phosphoric acid, tartaric acid, citric acid, succinic acid, malic acid, lactic acid, aspartic acid, galactaric acid, glucoheptonic acid, gluconic acid, glucuronic acid, glutamic acid, glutaric acid, glycolic acid, lactobionic acid, malonic acid, and combinations thereof.

In another embodiment of the present disclosure, described herein, is a pharmaceutical composition for intranasal administration comprising nalbuphine or a salt thereof, an antiemetic agent, and an acidifying agent selected from the group consisting of sulfuric acid, methanesulfonic acid, nitric acid, formic acid, acetic acid, phosphoric acid, tartaric acid, citric acid, succinic acid, malic acid, lactic acid, aspartic acid, galactaric acid, glucoheptonic acid, gluconic acid, glucuronic acid, glutamic acid, glutaric acid, glycolic acid, lactobionic acid, malonic acid, and combinations thereof.

In another embodiment of the present disclosure, described herein, is a concentrated pharmaceutical composition for low volume intranasal administration comprising nalbuphine or a salt thereof and an acidifying agent selected from the group consisting of sulfuric acid, methanesulfonic acid, nitric acid, formic acid, acetic acid, phosphoric acid, tartaric acid, citric acid, succinic acid, malic acid, lactic acid, aspartic acid, galactaric acid, glucoheptonic acid, gluconic acid, glucuronic acid, glutamic acid, glutaric acid, glycolic acid, lactobionic acid, malonic acid, and combinations thereof, in an aqueous solution, wherein the composition is suitable for intranasal administration to a patient in need thereof, and comprises from about 2.5 to about 40 mg of nalbuphine per 0.1 mL/nostril dose to 0.2 mL/nostril dose of the composition.

In yet another embodiment of the present disclosure, disclosed herein, is a concentrated pharmaceutical composition for low volume intranasal administration comprising nalbuphine or a salt thereof and an acidifying agent selected from the group consisting of sulfuric acid, methanesulfonic acid, nitric acid, formic acid, acetic acid, phosphoric acid, tartaric acid, citric acid, succinic acid, malic acid, lactic acid, aspartic acid, galactaric acid, glucoheptonic acid, gluconic acid, glucuronic acid, glutamic acid, glutaric acid, glycolic acid, lactobionic acid, malonic acid, and combinations thereof, in an aqueous solution, wherein the composition is suitable for intranasal administration to a patient in need thereof, and comprises from about 2.5 to about 40 mg of nalbuphine base per 0.1 mL/nostril dose to 0.2 mL/nostril dose of the composition.

In still another embodiment of the present disclosure, described herein, is a concentrated pharmaceutical composition for low volume intranasal administration comprising nalbuphine or a salt thereof, an antiemetic agent, and an acidifying agent selected from the group consisting of sulfuric acid, methanesulfonic acid, nitric acid, formic acid, acetic acid, phosphoric acid, tartaric acid, citric acid, succinic acid, malic acid, lactic acid, aspartic acid, galactaric acid, glucoheptonic acid, gluconic acid, glucuronic acid, glutamic acid, glutaric acid, glycolic acid, lactobionic acid, malonic acid, and combinations thereof, in an aqueous solution, wherein the composition is suitable for intranasal administration to a patient in need thereof, and comprises from about 5 to about 40 mg of nalbuphine per 0.2 mL/nostril dose of the composition.

In still a further embodiment of the present disclosure, described herein, is a concentrated pharmaceutical composition for low volume intranasal administration for comprising nalbuphine and an acidifying agent, wherein the nalbuphine has a concentration from about 2.5% w/v to about 30.0% w/v, the mol ratio of the acidifying agent to the nalbuphine in the pharmaceutical composition is from about 0.1:1 to about 10:1, wherein the concentration of the acidifying agent is from about 0.1M to about 5M, and wherein the pharmaceutical composition has a pH from about 3.0 to about 7.5.

In any one of the preceding embodiments of the present disclosure, the pharmaceutical composition for intranasal administration further comprises a pharmaceutically acceptable excipient selected from the group consisting of a preservative, a stabilizer, a cosolvent, a viscosity enhancer, a surfactant, an absorption enhancer, a solvent, and combinations thereof.

In some aspects, the pharmaceutical composition further comprises a preservative. In some additional aspects, preservative comprises benzalkonium chloride, potassium sorbate, benzyl alcohol, methylparaben, propylparaben, sodium benzoate, or a combination thereof. In further aspects, the preservative has a concentration from about 0.002% w/v to about 5% w/v.

In some aspects, the pharmaceutical composition comprises a stabilizer. In some additional examples, the stabilizer comprises EDTA sodium. In some additional aspects, the stabilizer has a concentration from about 0.005% w/v to about 0.02% w/v.

In some aspects, the pharmaceutical composition comprises a viscosity enhancer. In some additional aspects, the viscosity enhancer comprises hydroxypropyl methylcellulose, Carbopol, hydroxypropyl cellulose, carboxymethylcellulose sodium (CMC-Na), pectin, sodium alginate, or a combination thereof. In some additional aspects, the viscosity enhancer has a concentration from about 0.0001% w/v to about 0.005% w/v. In some aspects, the pharmaceutical composition may have a viscosity from about 1 cP to about 30 cP.

In some aspects, the pharmaceutical composition comprises a surfactant. In some additional aspects, the surfactant comprises polyoxyethylene sorbitan monooleate, Polysorbate 20, Polysorbate 80, benzalkonium chloride, KOLLIPHOR® HS 15 (polyoxyl 15 hydroxystearate), or a combination thereof. In still further aspects, the surfactant has a concentration from about 0.001% w/v to about 3% w/v.

In some aspects, the pharmaceutical composition comprises a cosolvent. In some additional aspects, the cosolvent comprises glycerin, glycerol, propylene glycol, polyethylene glycol, ethanol, or a combination thereof. In still further aspects, the cosolvent has a concentration of up to about 20% w/v.

In some aspects, the pharmaceutical composition comprises water.

In some aspects, the pharmaceutical composition comprises an absorption enhancer. In some additional aspects, the absorption enhancer comprises Polysorbate 20, Polysorbate 80, benzalkonium chloride, glycerin, propylene glycol, cyclodextrin, polyethylene glycol, lecithin, KOLLIPHOR® HS 15, hydroxypropyl methylcellulose, hydroxypropyl cellulose, cyclopentadecanolide, chitosan, polyvinylpyrrolidone, pectin, Carbopol, sodium alginate, or any combination thereof. In still further aspects, the absorption enhancer has a concentration in the concentrated pharmaceutical composition from about 0.1 mg/mL±0.25 mg/mL to about 0.5 mg/mL±0.25 mg/mL.

In any one of the preceding embodiments of the present disclosure, the nalbuphine or salt thereof comprises nalbuphine base. In some aspects, the nalbuphine has a concentration from about 2.5% w/v to about 40.0% w/v. In some exemplary aspects, the nalbuphine has a concentration from about 5.0% w/v to about 25.0% w/v, or more preferably about 5.0% w/v to about 20.0% w/v.

In any one of the preceding embodiments of the present disclosure, the nalbuphine has a concentration from about 20.0% w/v to about 30.0% w/v, or about 30.0% w/v to about 40.0% w/v. In some additional aspects, the nalbuphine has a concentration of greater than about 30.0% w/v.

In some aspects, the pharmaceutical composition comprises an antiemetic agent. In some additional aspects, the antiemetic agent comprises granisetron, palonosetron, ondansetron, or a salt thereof. In still further aspects, the antiemetic agent has a concentration in the pharmaceutical composition from about 0.10 mg/mL to about 100 mg/mL.

In any one of the preceding aspects of the present disclosure, the composition comprises two or more acidifying agents. In any one of the proceeding aspects of the present disclosure, the composition comprises three or more acidifying agents.

In any one of the preceding aspects of the present disclosure, a dose of 0.2 mL of the pharmaceutical composition is effective for the treatment of pain management in an adult human patient in need thereof. In any one of the proceeding aspects of the present disclosure, a dose of 0.2 mL is effective for the treatment of pain management in an adult human patient in need thereof.

In any one of the preceding aspects of the present disclosure, the dose is effective for the treatment of pain management in 600 seconds or more. In any one of the preceding aspects, the dose is effective for the treatment of pain management in 900 seconds or more, 1000 seconds or more, or 1200 seconds or more.

In any one of the preceding aspects of the present disclosure, the dose is effective for the treatment of pain management in 900 seconds or less. In any one of the preceding aspects, the dose is effective for the treatment of pain management in 800 seconds or less, 700 seconds or less, or 600 seconds or less.

In any one of the preceding aspects of the present disclosure, the pharmaceutical composition is suitable for administration to a patient in need thereof without reconstitution.

In any one of the preceding aspects of the present disclosure, the composition has a pH from about 3.0±0.5 to about 7.5±0.5 or from about 3.0±0.3 to about 7.5±0.3. In some additional aspects, the composition has a pH from about 3.0 to about 4.0. In still further aspects, the composition has a pH from about 5.0 to about 6.0.

In any one of the preceding aspects of the present disclosure, the composition comprises about 1.0 wt. % or less, about 0.5 wt. % or less, about 0.1 wt. % or less, or about 0.01 wt. % or less of nalbuphine β-epimer.

In any one of the proceeding aspects of the present disclosure, the composition comprises about 1.0 wt. % or less, about 0.5 wt. % or less, about 0.3 wt. % or less, about 0.2 wt. % or less, or about 0.1 wt. % or less of total impurities.

In some aspects, the composition comprises less than 0.1 wt. % or less of the total impurities after storage for 1 week at 60° C. In some additional aspects, the composition comprises less than 0.1 wt. % or less of the total impurities after storage for 2 weeks at 60° C.

In some aspects, the composition comprises about 0.5 wt. % or less of total impurities after storage for 1 month at 40° C. and 75% relative humidity. In some additional aspects, the composition comprises about 0.5 wt. % or less of total impurities after storage for 3 months at 40° C. and 75% relative humidity.

In some aspects, the composition comprises about 0.5 wt. % or less of total impurities after storage for 3 months at 25° C. and 60% relative humidity. In some additional aspects, the composition comprises about 0.5 wt. % or less of total impurities after storage for 6 months at 25° C. and 60% relative humidity.

In some aspects, the composition comprises about 0.1 wt. % or less of nalbuphine β-epimer after storage for 1 week at 60° C. In some additional aspects, the composition comprises about 0.1 wt. % or less of nalbuphine β-epimer after storage for 2 weeks at 60° C.

In some aspects, the composition comprises about 0.1 wt. % or less of nalbuphine β-epimer after storage for 1 month at 40° C. and 75% relative humidity. In some additional aspects, the composition comprises about 0.1 wt. % or less of nalbuphine β-epimer after storage for 3 months at 40° C. and 75% relative humidity.

In some aspects, the composition comprises about 0.1 wt. % or less of nalbuphine β-epimer after storage for 3 months at 25° C. and 60% relative humidity. In some additional aspects, the composition comprises about 0.1 wt. % or less of nalbuphine β-epimer after storage for 6 months at 25° C. and 60% relative humidity.

In some aspects, the composition has an absolute bioavailability from about 30% to about 70%.

In another embodiment of the present disclosure, described herein, is a method for treating pain comprising administering the pharmaceutical composition to a subject in need thereof. The pharmaceutical composition may comprise any one of the pharmaceutical compositions described above.

In yet another embodiment of the present disclosure, disclosed herein, is a method of treating pain in a subject in need thereof, the method comprising administering a pharmaceutical composition comprising nalbuphine and an acidifying agent selected from the group consisting of sulfuric acid, methanesulfonic acid, nitric acid, formic acid, acetic acid, phosphoric acid, tartaric acid, citric acid, succinic acid, malic acid, lactic acid, aspartic acid, galactaric acid, glucoheptonic acid, gluconic acid, glucuronic acid, glutamic acid, glutaric acid, glycolic acid, lactobionic acid, malonic acid, and combinations thereof, wherein the administration is performed intranasally. In some aspects, the subject is a human. In some aspects, the administration results in a $C_{max}$ of nalbuphine of about 10 ng/mL to about 70 ng/mL. In some aspects, the administration results in a $T_{max}$ of nalbuphine of about 0.2 h to about 0.8 h. In some aspects, the administration results in a $T_{1/2}$ of nalbuphine from about 2.0 h to about 3.0 h. In some aspects, the administration results in a $AUC_{0-inf}$ of nalbuphine from about 80 ng·h/mL to about 200 ng·h/mL.

In some aspects, the pharmaceutical composition has a shot weight from about 25 mg to about 250 mg such as from about 100 mg to about 250 mg, or from about 150 mg to about 250 mg.

In still another embodiment of the present disclosure, descried herein, is a method of preparing a concentrated pharmaceutical composition for low volume administration. The method generally comprises: combining nalbuphine or a salt thereof and an acidifying agent to provide a highly concentrated nalbuphine solution; optionally adding benzalkonium chloride to the solution; and adjusting the pH of the solution to 3.0±0.5 to 7.5±0.5. In some aspects, the pH of the solution is adjusted to 3.0±0.3 to 7.5±0.3. In some aspects, the concentration of benzalkonium chloride in the solution is about 0.2 mg/mL±0.1 mg/mL. In some aspects, the method further comprises diluting the solution with water or a buffer. In still further aspects, the method further comprises filling the solution in a nasal spray device with nitrogen protection.

In some aspects, the method further comprises adding a pharmaceutically acceptable excipient selected from the group consisting of a stabilizer, a cosolvent, a viscosity enhancer, a surfactant, an absorption enhancer, and combinations thereof.

In some aspects, the pharmaceutically acceptable excipient a preservative. In some additional aspects, the preservative comprises benzalkonium chloride, potassium sorbate, benzyl alcohol, methylparaben, propylparaben, sodium benzoate, or a combination thereof. In still further aspects, the preservative has a concentration from about 0.05% w/v to about 0.15% w/v.

In some aspects, the pharmaceutically acceptable excipient comprises a stabilizer. In some additional aspects, the stabilizer comprises EDTA sodium. In still further aspects, the stabilizer has a concentration from about 0.005% w/v to about 5% w/v.

In some aspects, the pharmaceutically acceptable excipient comprises a viscosity enhancer. In some additional aspects, the viscosity enhancer comprises hydroxypropyl methylcellulose, Carbopol, hydroxypropyl cellulose, carboxymethylcellulose sodium (CMC-Na), pectin, sodium alginate, or a combination thereof. In still further aspects, the viscosity enhancer has a concentration from about 0.0001% w/v to about 0.005% w/v. In some aspects, the pharmaceutical composition may have a viscosity from about 1 cP to about 30 cP.

In any one of the proceeding aspects of the present disclosure, the pharmaceutically acceptable excipient comprises a surfactant. In some additional aspects, the surfactant comprises polyoxyethylene sorbitan monooleate, Polysorbate 20, Polysorbate 80, benzalkonium chloride, KOLLIPHOR® HS 15, or a combination thereof. In still further aspects, the surfactant has a concentration from about 0.001% w/v to about 3% w/v.

In some aspects, the pharmaceutically acceptable excipient comprises a cosolvent. In some additional aspects, the cosolvent comprises glycerin, glycerol, propylene glycol, polyethylene glycol, ethanol, or a combination thereof. In still further aspects, the cosolvent has a concentration of up to about 20% w/v.

In some aspects, the pharmaceutically acceptable excipient comprises an absorption enhancer. In some additional aspects, the absorption enhancer comprises Polysorbate 20, Polysorbate 80, benzalkonium chloride, glycerin, propylene glycol, cyclodextrin, polyethylene glycol, lecithin, KOLLIPHOR® HS 15, hydroxypropyl methylcellulose, hydroxypropyl cellulose, cyclopentadecanolide, chitosan, polyvinylpyrrolidone, pectin, Carbopol, sodium alginate, or combinations thereof. In still further aspects, the absorption enhancer has a concentration in the pharmaceutical composition from about 0.1 mg/mL±0.25 mg/mL to about 0.5 mg/mL±0.25 mg/mL.

In some aspects, the nalbuphine has a concentration from about 2.5% w/v to about 30.0% w/v.

In some aspects, the method further comprises adding an antiemetic agent to the solution. In some additional aspects, the antiemetic agent comprises granisetron, palonosetron, ondansetron, or a salt thereof. In still further aspects of the present disclosure, the antiemetic agent has a concentration in the pharmaceutical composition from about 0.10 mg/mL to about 100 mg/mL.

Other features and iterations of the invention are described in more detail below.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1:
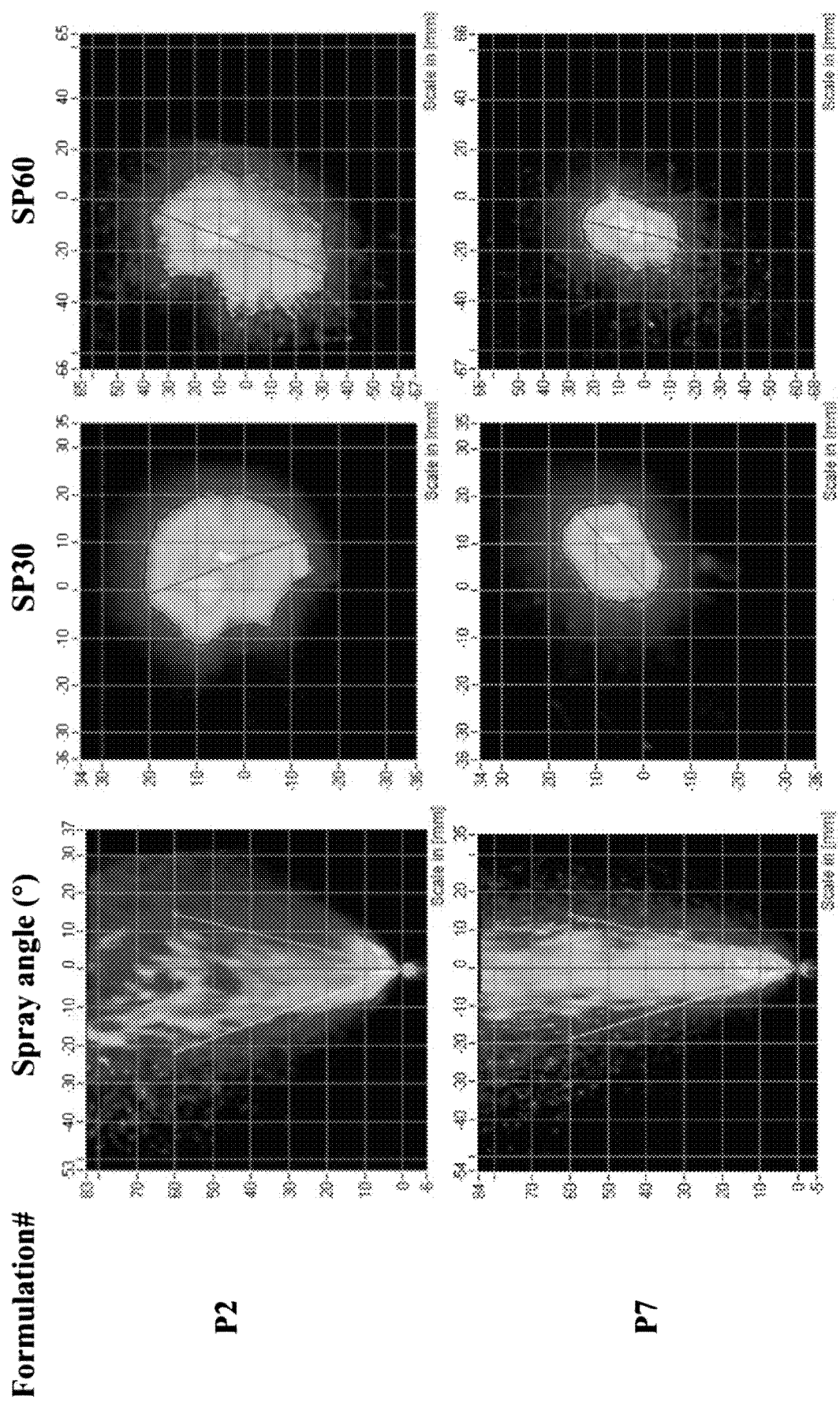
FIG. 1 shows the spray patterns of two exemplary formulations of the present disclosure.

Before the present invention is disclosed and described, it is to be understood that this invention is not limited to the particular methods, compositions, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Concentrations, amounts, and other numerical data may be expressed or presented herein in a range format. It is to be understood that such a range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 2 to about 50" should be interpreted to include not only the explicitly recited values of 2 to 50, but also include all individual values and sub-ranges within the indicated range. Thus, included in this numerical range are individual values such as 2, 2.4, 3, 3.7, 4, 5.5, 10, 10.1, 14, 15, 15.98, 20, 20.13, 23, 25.06, 30, 35.1, 38.0, 40, 44, 44.6, 45, 48, and sub-ranges such as from 1-3, from 2-4, from 5-10, from 5-20, from 5-25, from 5-30, from 5-35, from 5-40, from 5-50, from 2-10, from 2-20, from 2-30, from 2-40, from 2-50, etc. This same principle applies to ranges reciting only one numerical value as a minimum or a maximum. Furthermore, such an interpretation should apply regardless of the breadth of the range, or the characteristics being described.

As used herein, the term "about" is used to provide flexibility to a numerical range endpoint by providing that a given value may be "a little above" or "a little below" the endpoint. For example, the endpoint may be within 10%, 8%, 5%, 3%, 2%, or 1% of the listed value. Further, for the sake of convenience and brevity, a numerical range of "about 50 mg/mL to about 80 mg/mL" should also be understood to provide support for the range of "50 mg/mL to 80 mg/mL." The endpoint may also be based on the variability allowed by an appropriate regulatory body, such as the FDA, USP, etc.

In this disclosure, the terms "including," "containing," and/or "having" are understood to mean comprising and are open ended terms.

In this disclosure, the term "Q.S." is understood to indicate "add as much water as is needed to achieve the desired result, but not more."

Described herein are compositions and methods of preparing compositions containing Nalbuphine for intranasal administration at high concentrations, low volumes (e.g., less than 0.5 mL, or preferably less than 0.3 mL, or even more preferably ≤0.2 mL), and/or high dosages to a human patient in need thereof. The intranasal compositions of Nalbuphine may deliver Nalbuphine with a much higher efficiency and efficacy than other intranasal compositions.

I. Nalbuphine Compositions for Intranasal Administration

In one aspect, the present disclosure encompasses a pharmaceutical composition for intranasal administration. The composition comprises nalbuphine or a pharmaceutically acceptable salt thereof and an acidifying agent. The acidifying agent may be an organic acid or an inorganic acid. The acidifying agent may be selected from the group consisting of sulfuric acid, methanesulfonic acid, nitric acid, formic acid, acetic acid, phosphoric acid, tartaric acid, citric acid, succinic acid, malic acid, lactic acid, aspartic acid, galactaric acid, glucoheptonic acid, gluconic acid, glucuronic acid, glutamic acid, glutaric acid, glycolic acid, lactobionic acid, malonic acid, and combinations thereof. The pharmaceutical compositions for intranasal administration may further comprise a pharmaceutically acceptable excipient comprising a preservative, a stabilizer, a cosolvent, a viscosity enhancer, a surfactant, an absorption enhancer, a solvent, or combinations thereof.

Nalbuphine or a Salt Thereof

The pharmaceutical compositions for intranasal administration include nalbuphine or a pharmaceutically acceptable salt thereof. In one embodiment, the pharmaceutical composition includes nalbuphine. Nalbuphine is a derivative of morphine and is also referred as N-cyclobutylmethyl-14-hydroxydihydronormorphine. Generally, nalbuphine or a salt of nalbuphine may have a concentration in the pharmaceutical composition ranging from about 2.5% w/v (weight/volume) to about 40% w/v. In various embodiments, the concentration of nalbuphine or a salt may be about 2.5% w/v, about 3.0% w/v, about 4.0% w/v, about 5.0% w/v, about 6.0% w/v, about 7.0% w/v, about 8.0% w/v, about 9.0% w/v, about 10.0% w/v, about 11.0% w/v, about 12.0% w/v, about 13.0% w/v, about 14.0% w/v, about 15.0% w/v, about 16.0% w/v, about 17.0% w/v, about 18.0% w/v, about 19.0% w/v, about 20.0% w/v, about 21.0% w/v, about 22.0% w/v, about 23.0% w/v, about 24.0% w/v, about 25.0% w/v, about 26.0% w/v, about 27.0% w/v, about 28.0% w/v, about 29.0% w/v, about 30.0% w/v, about 31.0% w/v, about 32.0% w/v, about 33.0% w/v, about 34.0% w/v, about 35.0% w/v, about 36.0% w/v, about 37.0% w/v, about 38.0% w/v, about 39.0% w/v, or about 40.0% w/v. In various embodiments, the concentration of nalbuphine or a salt thereof may be from about 2.5% w/v to about 5.0% w/v, from about 5.0% w/v to about 7.5% w/v, from about 7.5% w/v to about 10.0% w/v, from about 10.0% w/v to about 12.5% w/v, from about 12.5% w/v to about 15.0% w/v, from about 15.0% w/v to about 17.5% w/v, from about 17.5% w/v to about 20.0% w/v, from about 20.0% w/v to about 22.5% w/v, from about 22.5% w/v to about 25.0% w/v, from about 25.0% w/v to about 27.5% w/v, from about 27.5% w/v to about 30.0% w/v, about 30.0% w/v to about 32.5% w/v, about 32.5% w/v to about 35.0% w/v, about 35.0% w/v to about 37.5% w/v, about 37.5% w/v to about 40.0% w/v, from about 2.5% w/v to about 10.0% w/v, about 2.5% w/v to about 20.0% w/v, about 5.0% w/v to about 20.0% w/v, about 10.0% w/v to about 20.0% w/v, about 10.0% w/v to about 30.0% w/v, or about 20.0% w/v to about 30.0% w/v. In some embodiments, the concentration of nalbuphine or a salt thereof may be greater than about 40.0% w/v.

Acidifying Agent

The pharmaceutical compositions for intranasal administration include an acidifying agent. The acidifying agent disclosed herein may comprise an inorganic acid or an organic acid. Preferably, the acidifying agent includes an organic acid. The acidifying agent is preferably non-toxic, useful for intranasal administration, and provides a high solubility of nalbuphine in the pharmaceutical composition. In some aspects, the acidifying agent may be selected from the group consisting of sulfuric acid, methanesulfonic acid, nitric acid, formic acid, acetic acid, phosphoric acid, tartaric acid, citric acid, succinic acid, malic acid, lactic acid, aspartic acid, galactaric acid, glucoheptonic acid, gluconic acid, glucuronic acid, glutamic acid, glutaric acid, glycolic acid, lactobionic acid, malonic acid, and combinations thereof. The acidifying agent may be anhydrous, a monohydrate, a dihydrate, or a multi-hydrate.

It will be understood by those having ordinary skill in the art that the concentration of the acidifying agent will vary depending on several factors, such as the acidifying agent used, whether the acidifying agent is monoprotic or polyprotic, and the desired pH of the pharmaceutical composition. Generally, the concentration of the acidifying agent is sufficient to completely dissolve the nalbuphine and to adjust the pH to the desired range. While not wishing to be bound by theory, the pH may be adjusted to about 3.0±0.5 to about 7.5±0.5.

The concentration of the acidifying agent may be from about 0.1M (mol/L) to about 5M. In some embodiments, the concentration of the acidifying agent may be from about 0.1M to about 0.5M, about 0.1M to about 1.0M, about 0.1M to about 1.5M, about 0.1M to about 2.0M, about 0.1M to about 2.5M, about 0.1M to about 3.0M, about 0.1M to about 3.5M, about 0.1M to about 4.0M, about 0.1M to about 4.5M, about 0.1M to about 5.0M, about 0.5M to about 5.0M, about 1.0M to about 5.0M, about 1.5M to about 5.0M, about 2.0M to about 5.0M, about 2.5M to about 5.0M, about 3.0M to about 5.0M, about 3.5M to about 5.0M, about 4.0M to about 5.0M, or about 4.5M to about 5.0M. In some additional embodiments, the concentration of the acidifying agent may be about 0.1M, 0.2M, 0.3M, 0.4M, 0.5M, 0.6M, 0.7M, 0.8M, 0.9M, 1.0M, 1.1M, 1.2M, 1.3M, 1.4M, 1.5M, 1.6M, 1.7M, 1.8M, 1.9M, 2.0M, 2.1M, 2.2M, 2.3M, 2.4M, 2.5M, 2.6M, 2.7M, 2.8M, 2.9M, 3.0M, 3.1M, 3.2M, 3.3M, 3.4M, 3.5M, 3.6M, 3.7M, 3.8M, 3.9M, 4.0M, 4.1M, 4.2M, 4.3M, 4.4M, 4.5M, 4.6M, 4.7M, 4.8M, 4.9M or about 5.0M.

In some particular embodiments, the concentration of the acidifying agent in the pharmaceutical composition may be from about 0.2M (mol/L) to about 0.6M. In various embodiments, the concentration of the acidifying agent may be from about 0.2M to about 0.25M, from about 0.25M to about 0.30M, from about 0.30M to about 0.35M, from about 0.35M to about 0.40M, from about 0.40M to about 0.45M, from about 0.45M to about 0.50M, from about 0.50M to about 0.55M, or from about 0.55M to about 0.6M. In various embodiments, the concentration of the acidifying agent may be about 0.2M, about 0.21M, about 0.22M, about 0.23M, about 0.24M, about 0.25M, about 0.26M, about 0.27M, about 0.28M, about 0.29M, about 0.30M, about 0.31M, about 0.32M, about 0.33M, about 0.34M, about 0.35M, about 0.36M, about 0.37M, about 0.38M, about 0.39M, about 0.40M, about 0.41M, about 0.42M, about 0.43M, about 0.44M, about 0.45M, about 0.46M, about 0.47M, about 0.48M, about 0.49M, about 0.50M, about 0.51M, about 0.52M, about 0.53M, about 0.54M, about 0.55M, about 0.56M, about 0.57M, about 0.58M, about 0.59M, about 0.60M, about 0.2M to about 0.3M, about 0.2M to about 0.4M, about 0.2M to about 0.5M, about 0.2M to about 0.6M, about 0.3M to about 0.6M, about 0.4M to about 0.2M, or about 0.5M to about 0.6M.

The mol ratio of the acidifying agent to the nalbuphine in the pharmaceutical composition may be from about 0.1:1 to about 10:1. In some embodiments, the mol ratio of the acidifying agent to the nalbuphine may be from about 0.1:1 to about 1:1, about 0.1:1 to about 2:1, about 0.1:1 to about 3:1, about 0.1:1 to about 4:1, about 0.1:1 to about 5:1, about 0.1:1 to about 6:1, about 0.1:1 to about 7:1, about 0.1:1 to about 8:1, about 0.1:1 to about 9:1, about 0.1:1 to about 10:1, about 1:1 to about 10:1, about 2:1 to about 10:1, about 3:1 to about 10:1, about 4:1 to about 10:1, about 5:1 to about 10:1, about 6:1 to about 10:1, about 7:1 to about 10:1, about 8:1 to about 10:1, or about 9:1 to about 10:1. In some additional embodiments, the mol ratio of the acidifying agent to the nalbuphine may be about 0.1:1, 0.2:1, 0.3:1, 0.4:1, 0.5:1, 0.6:1, 0.7:1, 0.8:1, 0.9:1, 1.0:1, 1.5:1, 2.0:1, 2.5:1, 3.0:1, 3.5:1, 4.0:1, 4.5:1, 5.0:1, 5.5:1, 6.0:1, 6.5:1, 7.0:1, 7.5:1, 8.0:1, 8.5:1, 9.0:1, 9.5:1, or about 10.0:1.

Without wishing to be bound by theory, when the acidifying agent is a strong acid the ratio of the acidifying agent to nalbuphine may be low, such as from about 0.1:1 to about 5:1. For example, when the acidifying agent is $H_2SO_4$, then the mol ratio of the acidifying agent to the nalbuphine may be from about 0.1:1 to about 2:1. For example when the acidifying agent is citric acid, the ratio may be from about 0.1:1 to 3:1.

The pharmaceutical composition for intranasal administration may include water. The water used in the pharmaceutical composition may be purified water.

In general, the amount of water added to the pharmaceutical composition is Q.S. Q.S. defines the amount of water that is needed to achieve the desired volume of the pharmaceutical composition. In an embodiment, the amount of water used in the pharmaceutical composition is added to achieve a volume of about 1 mL.

Pharmaceutical Excipient

The pharmaceutical composition for intranasal administration may further comprise a pharmaceutically acceptable excipient. The pharmaceutically acceptable excipient is selected from the group consisting of a preservative, a stabilizer, a cosolvent, a viscosity enhancer, a surfactant, an absorption enhancer, a solvent, and combinations thereof. In particular embodiments, the pharmaceutical composition may be free of pharmaceutically acceptable excipients; thus, the pharmaceutical composition may consist of nalbuphine, an acidifying agent, and water. In other embodiments, the pharmaceutical composition may be substantially free of pharmaceutically acceptable excipients. As used herein, the phrase "substantially free of pharmaceutically acceptable excipients" means that the pharmaceutical composition comprises a single preservative to improve shelf life of and/or prevent bacterial growth in the pharmaceutical composition.

The pharmaceutical composition for intranasal administration may include a preservative. The preservative may comprise benzalkonium chloride, potassium sorbate, benzyl alcohol, methylparaben, propylparaben, sodium benzoate, or a combination thereof, or other preservatives known in the art. In one embodiment, the preservative comprises benzalkonium chloride. In some embodiments, the pharmaceutical composition may not comprise a preservative; i.e., the preservative may be absent from the pharmaceutical formulation. Thus, the pharmaceutical composition may be free of a preservative.

Generally, the preservative may have a concentration in the pharmaceutical composition from about 0.002% w/v to about 5% w/v, such as from about 0.002% w/v to about 0.005% w/v, about 0.002% w/v to about 0.01% w/v, about 0.002% w/v to about 0.05% w/v, about 0.002% w/v to about 0.1% w/v, about 0.002% w/v to about 0.5% w/v, about 0.002% w/v to about 1% w/v, about 0.002% w/v to about 5% w/v, about 0.005% w/v to about 5% w/v, about 0.01% w/v to about 5% w/v, about 0.05% w/v to about 5% w/v, about 0.1% w/v to about 5% w/v, about 0.5% w/v to about 5% w/v, or about 1% w/v to about 5% w/v. In some particular embodiments, the concentration of the preservative may range from about 0.002% w/v to about 0.02% w/v in the pharmaceutical composition. In various embodiments, the concentration of the preservative in the pharmaceutical composition may be about 0.002% w/v, about 0.003% w/v, about 0.004% w/v, about 0.005% w/v, about 0.006% w/v, about 0.007% w/v, about 0.008% w/v, about 0.009% w/v, about 0.01% w/v, or about 0.02% w/v. In various embodiments, the concentration of the preservative may be from about 0.002% w/v to about 0.004% w/v, 0.002% w/v to about 0.006% w/v, 0.002% w/v to about 0.008% w/v, 0.002% w/v to about 0.01% w/v, 0.002% w/v to about 0.02% w/v, 0.004% w/v to about 0.02% w/v, about 0.006% w/v to about 0.02% w/v, about 0.008% w/v to about 0.02% w/v, or about 0.01% w/v to about 0.02% w/v.

In a preferred embodiment, the preservative may comprise benzalkonium chloride at a concentration in the pharmaceutical composition from about 0.002% w/v to about 0.02% w/v. In another embodiment, the preservative may comprise benzalkonium chloride at a concentration of about 0.005% or less.

The pharmaceutical composition for intranasal administration may include a stabilizer. The stabilizer disrupts biofilms which may be caused by bacteria and fungi. The stabilizer may comprise EDTA sodium or other stabilizers known in the art. The EDTA sodium may be anhydrous, a monohydrate, a dihydrate, or a multi-hydrate. In some embodiments, the pharmaceutical composition may not comprise a stabilizer; i.e., the stabilizer may be absent from the pharmaceutical formulation. Thus, the pharmaceutical composition may be free of a stabilizer.

In general, the stabilizer may have a concentration in the pharmaceutical composition from about 0.005% w/v to about 5% w/v, such as from about 0.005% w/v to about 0.01% w/v, about 0.005% w/v to about 0.05% w/v, about 0.005% w/v to about 0.1% w/v, about 0.005% w/v to about 0.5% w/v, about 0.005% w/v to about 1% w/v, about 0.005% w/v to about 5% w/v, about 0.01% w/v to about 5% w/v, about 0.05% w/v to about 5% w/v, about 0.1% w/v to about 5% w/v, about 0.5% w/v to about 5% w/v, or about 1% w/v to about 5% w/v. In some particular embodiments, the stabilizer may have a concentration in the pharmaceutical composition for intranasal administration ranging from about 0.005% w/v to about 0.1% w/v. In various embodiments, the concentration of the stabilizer may be about 0.005% w/v, about 0.006% w/v, about 0.007% w/v, about 0.008% w/v, about 0.009% w/v, about 0.01% w/v, about 0.02% w/v, about 0.03% w/v, about 0.04% w/v, about 0.05% w/v, about 0.06% w/v, about 0.07% w/v, about 0.08% w/v, about 0.09% w/v, or about 0.1% w/v. In various embodiments, the concentration of the stabilizer in the pharmaceutical composition may be from about 0.005% w/v to about 0.0075% w/v, about 0.005% w/v to about 0.01% w/v, about 0.005% w/v to about 0.025% w/v, about 0.005% w/v to about 0.05% w/v, about 0.005% w/v to about 0.075% w/v, about 0.005% w/v to about 0.1% w/v, about 0.0075% w/v to about 0.1% w/v, about 0.01% w/v to about 0.1% w/v, about 0.025% w/v to about 0.1% w/v, about 0.05% w/v to about 0.1% w/v, or about 0.075% w/v to about 0.1% w/v.

The pharmaceutical composition for intranasal administration may include a viscosity enhancer which aids in the viscosity of the intranasal composition. The viscosity enhancer may comprise hydroxypropyl methylcellulose (HPMC), Carbopol, hydroxypropyl cellulose (HPC), carboxymethylcellulose sodium (CMC-Na), pectin, sodium alginate, or a combination thereof, or other viscosity enhancers known in the art. In some embodiments, the pharmaceutical composition may not comprise a viscosity enhancer; i.e., the viscosity enhancer may be absent from the pharmaceutical formulation. Thus, the pharmaceutical composition may be free of a viscosity enhancer.

Generally, the viscosity enhancer may have a concentration in the pharmaceutical composition from about 0.0001% w/v to about 0.5% w/v, such as from about 0.0001% w/v to about 0.0005% w/v, about 0.0001% w/v to about 0.001% w/v, about 0.0001% w/v to about 0.005% w/v, about 0.0001% w/v to about 0.01% w/v, about 0.0001% w/v to about 0.05% w/v, about 0.0001% w/v to about 0.1% w/v, about 0.0001% w/v to about 0.5% w/v, about 0.0005% w/v to about 0.5% w/v, about 0.001% w/v to about 0.5% w/v, about 0.005% w/v to about 0.5% w/v, about 0.01% w/v to about 0.5% w/v, about 0.05% w/v to about 0.5% w/v, or about 0.1% w/v to about 0.5% w/v. In some particular embodiments, the viscosity enhancer may have a concentration in the pharmaceutical composition from about 0.0001% w/v to about 0.005% w/v. In various embodiments, the concentration of the viscosity enhancer in the pharmaceutical composition may be about 0.0001% w/v, about 0.0003% w/v, about 0.0005% w/v, about 0.0007% w/v, about 0.0009% w/v, about 0.0011% w/v, about 0.0013% w/v, about 0.0015% w/v, about 0.0017% w/v, about 0.0019% w/v, about 0.0021% w/v, about 0.0023% w/v, about 0.0025% w/v, about 0.0027% w/v, about 0.0029% w/v, about 0.0031% w/v, about 0.0033% w/v, about 0.0035% w/v, about 0.0037% w/v, about 0.0039% w/v, about 0.0041% w/v, about 0.0043% w/v, about 0.0045% w/v, about 0.0047% w/v, about 0.0049% w/v, or about 0.005% w/v. In various embodiments, the concentration of the viscosity enhancer may be about 0.0001% w/v to about 0.0003% w/v, about 0.0003% w/v to about 0.0005% w/v, about 0.0005% w/v to about 0.0007% w/v, about 0.0007% w/v to about 0.0009% w/v, about 0.0009% w/v to about 0.001% w/v, about 0.001% w/v to about 0.0013% w/v, about 0.0013% w/v to about 0.0015% w/v, about 0.0015% w/v to about 0.0017% w/v, about 0.0017% w/v to about 0.0019% w/v, about 0.0019% w/v to about 0.0021% w/v, about 0.0021% w/v to about 0.0023% w/v, about 0.0023% w/v to about 0.0025% w/v, about 0.0025% w/v to about 0.0027% w/v, about 0.0027% w/v to about 0.0029% w/v, about 0.0029% w/v to about 0.0031% w/v, about 0.0031% w/v to about 0.0033% w/v, about 0.0033% w/v to about 0.0035% w/v, about 0.0035% w/v to about 0.0037% w/v, about 0.0037% w/v to about 0.0039% w/v, about 0.0039% w/v to about 0.0041% w/v, about 0.0041% w/v to about 0.043% w/v, about 0.0043% w/v to about 0.0045% w/v, about 0.0045% w/v to about 0.0047% w/v, about 0.0047% w/v to about 0.0049% w/v, about 0.0049% w/v to about 0.0050% w/v, about 0.0001% w/v to about 0.0005% w/v, about 0.0001% w/v to about 0.001% w/v, about 0.0001% w/v to about 0.005% w/v, about 0.0005% w/v to about 0.005% w/v, or about 0.001% w/v to about 0.005% w/v.

In preferred embodiments, the viscosity enhancer comprises hydroxypropyl methylcellulose, hydroxypropyl cellulose, or carboxymethylcellulose sodium.

The amount of viscosity enhancer added may be sufficient to achieve a viscosity form about 1 cP to about 30 cP of the pharmaceutical composition. The pharmaceutical composition may have a viscosity of about 1 cP, about 2 cP, about 3 cP, about 4 cP, about 5 cP, about 6 cP, about 7 cP, about 8 cP, about 9 cP, about 10 cP, about 11 cP, about 12 cP, about 13 cP, about 14 cP, about 15 cP, about 16 cP, about 17 cP, about 18 cP, about 19 cP, about 20 cP, about 21 cP, about 22 cP, about 23 cP, about 24 cP, about 25 cP, about 26 cP, about 27 cP, about 28 cP, about 29 cP, or about 30 cP. Additionally, the pharmaceutical composition may have a viscosity from about 1 cP to about 5 cP, about 1 cP to about 10 cP, about 1 cP to about 15 cP, about 1 cP to about 20 cP, about 1 cP to about 25 cP, about 1 cP to about 30 cP, about 5 cP to about 30 cP, about 10 cP to about 30 cP, about 15 cP to about 30 cP, about 20 cP to about 30 cP, or about 25 cP to about 30 cP.

The pharmaceutical composition for intranasal administration may include a surfactant. The surfactant may reduce the surface tension of the solvent in which the surfactant is dissolved in. The surfactant may comprise polyoxyethylene sorbitan monooleate, Polysorbate 20, Polysorbate 80, benzalkonium chloride, KOLLIPHOR® HS 15, or combinations thereof, or other surfactants known in the art. In one embodiment, the surfactant comprises Polysorbate 80. In some embodiments, the pharmaceutical composition may not comprise a surfactant; i.e., the surfactant may be absent from the pharmaceutical formulation. Thus, the pharmaceutical composition may be free of a surfactant.

Generally, the surfactant may have a concentration in the pharmaceutical composition from about 0.001% w/v to about 3% w/v, such as from about 0.001% w/v to about 0.005% w/v, about 0.001% w/v to about 0.01% w/v, about 0.001% w/v to about 0.05% w/v, about 0.001% w/v to about 0.1% w/v, about 0.001% w/v to about 0.5% w/v, about 0.001% w/v to about 1% w/v, about 0.001% w/v to about 2% w/v, about 0.001% w/v to about 3% w/v, about 0.005% w/v to about 3% w/v, about 0.01% w/v to about 3% w/v, about 0.05% w/v to about 3% w/v, about 0.1% w/v to about 3% w/v, about 0.5% w/v to about 3% w/v, about 1% w/v to about 3% w/v, or about 2% w/v to about 3% w/v. In some aspects, the surfactant may have a concentration from about 0.001% w/v to about 0.005% w/v. In various embodiments, the concentration of the surfactant may be about 0.001% w/v, about 0.002% w/v, about 0.003% w/v, about 0.004% w/v, or about 0.005% w/v. In various embodiments, the surfactant may have a concentration from about 0.001% w/v to about 0.002% w/v, about 0.002% w/v to about 0.003% w/v, about 0.003% w/v to about 0.004% w/v, or about 0.004% w/v to about 0.005% w/v.

In preferred embodiments, the surfactant comprises polysorbate 20 or polysorbate 80.

The pharmaceutical composition for intranasal administration may include a cosolvent. The cosolvents aids the solubility of the components in the pharmaceutical composition with the solvent. The cosolvent may comprise glycerin, glycerol, propylene glycol, polyethylene glycol, ethanol, or a combination thereof, or other cosolvents known in the art. In one embodiment, the cosolvent comprises glycerin. In some embodiments, the pharmaceutical composition may not comprise a cosolvent; i.e., the cosolvent may be absent from the pharmaceutical formulation. Thus, the pharmaceutical composition may be free of a cosolvent.

Generally, the cosolvent may have a concentration in the pharmaceutical composition of up to about 20% w/v. In various embodiments, the concentration of the cosolvent in the pharmaceutical composition may be up to about 1% w/v, up to about 2% w/v, up to about 3% w/v, up to about 4% w/v, up to about 5% w/v, up to about 6% w/v, up to about 7% w/v, up to about 8% w/v, up to about 9% w/v, up to about 10% w/v, up to about 11% w/v, up to about 12% w/v, up to about 13% w/v, up to about 14% w/v, up to about 15% w/v, up to about 16% w/v, up to about 17% w/v, up to about 18% w/v, up to about 19% w/v, or up to about 20% w/v. In various embodiments, the concentration of the cosolvent in the pharmaceutical composition may be from about 0% w/v to about 5% w/v, about 0% w/v to about 10% w/v, about 0% w/v to about 15% w/v, about 0% w/v to about 20% w/v, about 5% w/v to about 20% w/v, about 10% w/v to about 20% w/v, or about 15% w/v to about 20% w/v.

The pharmaceutical composition for intranasal administration may include an absorption enhancer. The absorption enhancer aids in the permeation of the nalbuphine through the epithelial cell barrier in the nasal cavity. The absorption enhancer may comprise Polysorbate 20, Polysorbate 80, benzalkonium chloride, glycerin, propylene glycol, cyclodextrin, polyethylene glycol, lecithin, KOLLIPHOR® HS 15, hydroxypropyl methylcellulose, hydroxypropyl cellulose, cyclopentadecanolide, chitosan, polyvinylpyrrolidone (PVP), pectin, Carbopol, sodium alginate, or combinations thereof, or other absorption enhancers known in the art. In some embodiments, the pharmaceutical composition may not comprise an absorption enhancer; i.e., the absorption enhancer may be absent from the pharmaceutical formulation. Thus, the pharmaceutical composition may be free of an absorption enhancer.

Generally, the absorption enhancer may have a concentration in the pharmaceutical composition from about 0.001% w/v to about 3% w/v such as from about 0.001% w/v to about 0.005% w/v, about 0.001% w/v to about 0.01% w/v, about 0.001% w/v to about 0.05% w/v, about 0.001% w/v to about 0.1% w/v, about 0.001% w/v to about 0.5% w/v, about 0.001% w/v to about 1% w/v, about 0.001% w/v to about 2% w/v, about 0.001% w/v to about 3% w/v, about 0.005% w/v to about 3% w/v, about 0.01% w/v to about 3% w/v, about 0.05% w/v to about 3% w/v, about 0.1% w/v to about 3% w/v, about 0.5% w/v to about 3% w/v, about 1% w/v to about 3% w/v, or about 2% w/v to about 3% w/v. In some embodiments, the absorption enhancer may have a concentration in the pharmaceutical composition from about 0.001% w/v to about 0.005% w/v. In various embodiments, the concentration of the absorption enhancer may be about 0.001% w/v, about 0.002% w/v, about 0.003% w/v, about 0.004% w/v, or about 0.005% w/v. In various embodiments, the surfactant may have a concentration from about 0.001% w/v to about 0.002% w/v, about 0.002% w/v to about 0.003% w/v, about 0.003% w/v to about 0.004% w/v, or about 0.004% w/v to about 0.005% w/v.

Generally, the absorption enhancer may have a concentration in the pharmaceutical composition from about 0.1 mg/mL to about 5 mg/mL, such as from about 0.1 mg/mL to about 0.5 mg/mL, about 0.1 mg/mL to about 1 mg/mL, about 0.1 mg/mL to about 2 mg/mL, about 0.1 to about 3 mg/mL, about 0.1 to about 4 mg/mL, about 0.1 to about 5 mg/mL, about 0.5 mg/mL to about 5 mg/mL, about 1 mg/mL to about 5 mg/mL, about 2 mg/mL to about 5 mg/mL, about 3 mg/mL to about 5 mg/mL, or about 4 mg/mL to about 5 mg/mL. In some embodiments, the absorption enhancer has a concentration in the pharmaceutical composition may be from 0.1 mg/mL±0.25 mg/mL to 0.5 mg/mL±0.25 mg/mL. In various embodiments, the concentration of the absorption enhancer may be 0.5 mg/mL±0.25 mg/mL, 0.4 mg/mL±0.25 mg/mL, 0.3 mg/mL±0.25 mg/mL, 0.2 mg/mL±0.25 mg/mL, or 0.1 mg/mL±0.25 mg/mL. In some additional embodiments, the absorption enhancer has a concentration in the pharmaceutical composition may be from 0.1 mg/mL±0.1 mg/mL to 0.5 mg/mL±0.1 mg/mL. In various embodiments, the concentration of the absorption enhancer may be 0.5 mg/mL±0.1 mg/mL, 0.4 mg/mL±0.1 mg/mL, 0.3 mg/mL±0.1 mg/mL, 0.2 mg/mL±0.1 mg/mL, or 0.1 mg/mL±0.1 mg/mL.

Antiemetic Agent

The pharmaceutical composition may further comprise an antiemetic agent. The antiemetic agent is added to the pharmaceutical composition to reduce, prevent, or treat nausea and vomiting. The antiemetic agent may comprise granisetron, palonosetron, ondansetron, or a pharmaceutically acceptable salt thereof, or a combination thereof. In some embodiments, the pharmaceutical composition may not comprise an antiemetic agent; i.e., the antiemetic agent may be absent from the pharmaceutical formulation. Thus, the pharmaceutical composition may be free of an antiemetic agent.

In general, the antiemetic agent may have a concentration in the pharmaceutical composition from about 0.10 mg/mL to about 100 mg/mL. In various embodiments, the concentration of the antiemetic agent may have a concentration of about 0.10 mg/mL, about 1.0 mg/mL, about 5.0 mg/mL, about 10.0 mg/mL, about 15.0 mg/mL, about 20.0 mg/mL, about 25.0 mg/mL, about 30.0 mg/mL, about 35.0 mg/mL, about 40.0 mg/mL, about 45.0 mg/mL, about 50.0 mg/mL, about 60.0 mg/mL, about 65.0 mg/mL, about 70.0 mg/mL, about 75.0 mg/mL, about 80.0 mg/mL, about 85.0 mg/mL, about 90.0 mg/mL, about 95.0 mg/mL, or about 100.0 mg/mL. In various embodiments, the concentration of the antiemetic agent may be from about 0.10 mg/mL to about 1.0 mg/mL, about 1.0 mg/mL to about 5.0 mg/mL, about 5.0 mg/mL to about 10.0 mg/m, about 10.0 mg/mL to about 15.0 mg/mL, about 15.0 mg/mL to about 20.0 mg/mL, about 20.0 mg/mL to about 25.0 mg/mL, about 25.0 mg/mL to about 30.0 mg/mL, about 30.0 mg/mL to about 35.0 mg/mL, about 35.0 mg/mL to about 40.0 mg/mL, about 40.0 mg/mL to about 45.0 mg/mL, about 45.0 mg/mL to about 50.0 mg/mL, about 50.0 mg/mL to about 55.0 mg/mL, about 55.0 mg/mL to about 60.0 mg/m, about 60.0 mg/mL to about 65.0 mg/mL, about 65.0 mg/mL to about 70.0 mg/mL, about 70.0 mg/mL to about 75.0 mg/mL, about 75.0 mg/mL to about 80.0 mg/mL, about 80.0 mg/mL to about 85.0 mg/mL, about 85.0 mg/mL to about 90.0 mg/mL, about 90.0 mg/mL to about 95.0 mg/mL, or about 95.0 mg/mL to about 100.0 mg/mL, about 0.1 mg/mL to about 0.5 mg/mL, about 0.1 mg/mL to about 1.0 mg/mL, about 0.1 mg/mL to about 5.0 mg/mL, about 0.1 mg/mL to about 10.0 mg/mL, about 0.1 mg/mL to about 50.0 mg/mL, about 0.1 mg/mL to about 100.0 mg/mL, about 0.5 mg/mL to about 100.0 mg/mL, about 1.0 mg/mL to about 100.0 mg/mL, about 5.0 mg/mL to about 100.0 mg/mL, about 10.0 mg/mL to about 100.0 mg/mL, or about 50.0 mg/mL to about 100.0 mg/mL.

Properties of the Pharmaceutical Composition

In general, the pharmaceutical composition may have a pH from 3.0±0.5 to 7.5±0.5. In various embodiments, the pharmaceutical composition may have a pH from 3.0±0.5 to 4.0±0.5, 4.0±0.5 to 5.0±0.5, 5.0±0.5 to 6.0±0.5, 6.0±0.5 to 7.0±0.5, 6.0±0.5 to 7.5±0.5, 3.0±0.5 to 5.0±0.5, 3.0±0.5 to 6.0±0.5, or 4.0±0.5 to 6.0±0.5.

In various embodiments, the pharmaceutical composition may have a pH 3.0±0.3 to 4.0±0.3, 4.0±0.3 to 5.0±0.3, 5.0±0.3 to 6.0±0.3, or 6.0±0.3 to 7.5±0.3, 6.0±0.3 to 7.5±0.3, 3.0±0.3 to 5.0±0.3, 3.0±0.3 to 6.0±0.3, or 4.0±0.3 to 6.0±0.3.

Generally, the pharmaceutical composition may have an amount of the nalbuphine β-epimer present. Generally, the pharmaceutical composition comprises may comprise about 1.0 wt. % or less of nalbuphine β-epimer. In various embodiments, the pharmaceutical composition may comprise about 1.0 wt. % or less, about 0.9 wt. % or less, about 0.8 wt. % or less, about 0.7 wt. % or less, about 0.6 wt. % or less, about 0.5 wt. % or less, about 0.4 wt. % or less, about 0.3 wt. % or less, about 0.2 wt. % or less, about 0.1 wt. % or less, about 0.09 wt. % or less, about 0.08 wt. % or less, about 0.07 wt. % or less, about 0.06 wt. % or less, about 0.05 wt. % or less, about 0.04 wt. % or less, about 0.03 wt. % or less, about 0.02 wt. % or less, or about 0.01 wt. % or less of the nalbuphine β-epimer. In some embodiments, the pharmaceutical composition may be free of the nalbuphine β-epimer.

The pharmaceutical composition may comprise about 1.0 wt. % or less of total impurities. As used herein, "total impurities" does not include the nalbuphine β-epimer. In various embodiments, the pharmaceutical composition may comprise about 1.0 wt. % or less, about 0.9 wt. % or less, about 0.8 wt. % or less, about 0.7 wt. % or less, about 0.6 wt. % or less, about 0.5 wt. % or less, about 0.4 wt. % or less, about 0.3 wt. % or less, or about 0.2 wt. % or less of total impurities excluding the nalbuphine β-epimer.

The pharmaceutical composition may comprise about 0.5 wt. % or less of total impurities after storage for about 3 months or more at 25° C. and 60% relative humidity. In various embodiments, the composition may comprise about 0.5 wt. % or less of total impurities, the composition comprises about 0.4 wt. % or less of total impurities, the composition comprises about 0.3 wt. % or less of total impurities, the composition comprises about 0.2 wt. % or less of total impurities, or the composition comprises about 0.1 wt. % or less of total impurities after storage for about 3 months or more at 25° C. and 60% relative humidity.

The pharmaceutical composition may comprise about 0.5 wt. % or less of total impurities after storage for 6 months or more at 25° C. and 60% relative humidity. In various embodiments, the composition may comprise about 0.5 wt. % or less of total impurities, the composition comprises about 0.4 wt. % or less of total impurities, the composition comprises about 0.3 wt. % or less of total impurities, the composition comprises about 0.2 wt. % or less of total impurities, or the composition comprises about 0.1 wt. % or less of total impurities after storage for about 6 months or more at 25° C. and 60% relative humidity.

Generally, the pharmaceutical composition may comprise about 0.5 wt. % or less of total impurities after storage for 1 month or more at 40° C. and 75% relative humidity. In various embodiments, the pharmaceutical composition may comprise about 0.5 wt. % or less of total impurities, about 0.4 wt. % or less of total impurities, about 0.3 wt. % or less of total impurities, about 0.2 wt. % or less of total impurities, or about 0.1 wt. % or less of total impurities at 1 month or at 40° C. and 75% relative humidity.

In general, the pharmaceutical composition may comprise about 0.5 wt. % or less of total impurities after storage for 3 month or more at 40° C. and 75% relative humidity. In various embodiments, the pharmaceutical composition may comprise about 0.5 wt. % or less of total impurities, about 0.4 wt. % or less of total impurities, about 0.3 wt. % or less of total impurities, about 0.2 wt. % or less of total impurities, or about 0.1 wt. % or less of total impurities at 3 month or at 40° C. and 75% relative humidity.

The pharmaceutical composition may be stable at ambient conditions and at elevated temperatures and humidity. The pharmaceutical composition may comprise about 0.1 wt. % or less of total impurities after storage for 1 week at 60° C. In various embodiments, the pharmaceutical composition may comprise about 0.1 wt. % or less of total impurities, about 0.09 wt. % or less of total impurities, about 0.08 wt. % or less of total impurities, about 0.07 wt. % or less of total impurities, about 0.06 wt. % or less of total impurities, about 0.05 wt. % or less of total impurities, about 0.04 wt. % or less of total impurities, about 0.03 wt. % or less of total impurities, about 0.02 wt. % or less of total impurities, or about 0.01 wt. % or less of total impurities after storage for 1 week at 60° C.

The pharmaceutical composition may comprise about 0.1 wt. % or less of total impurities after storage for 2 weeks at 60° C. In various embodiments, the pharmaceutical composition may comprise about 0.1 wt. % or less of total impurities, about 0.09 wt. % or less of total impurities, about 0.08 wt. % or less of total impurities, about 0.07 wt. % or less of total impurities, about 0.06 wt. % or less of total impurities, about 0.05 wt. % or less of total impurities, about 0.04 wt. % or less of total impurities, about 0.03 wt. % or less of total impurities, about 0.02 wt. % or less of total impurities, or about 0.01 wt. % or less of total impurities after storage for 2 weeks at 60° C.

The pharmaceutical composition may comprise about 0.1 wt. % or less of total impurities after storage for 3 weeks at 60° C. In various embodiments, the pharmaceutical composition may comprise about 0.1 wt. % or less of total impurities, about 0.09 wt. % or less of total impurities, about 0.08 wt. % or less of total impurities, about 0.07 wt. % or less of total impurities, about 0.06 wt. % or less of total impurities, about 0.05 wt. % or less of total impurities, about 0.04 wt. % or less of total impurities, about 0.03 wt. % or less of total impurities, about 0.02 wt. % or less of total impurities, or about 0.01 wt. % or less of total impurities after storage for 3 weeks at 60° C.

The pharmaceutical composition may comprise about 0.1 wt. % or less of total impurities after storage for 4 weeks at 60° C. In various embodiments, the pharmaceutical composition may comprise about 0.1 wt. % or less of total impurities, about 0.09 wt. % or less of total impurities, about 0.08 wt. % or less of total impurities, about 0.07 wt. % or less of total impurities, about 0.06 wt. % or less of total impurities, about 0.05 wt. % or less of total impurities, about 0.04 wt. % or less of total impurities, about 0.03 wt. % or less of total impurities, about 0.02 wt. % or less of total impurities, or about 0.01 wt. % or less of total impurities after storage for 4 weeks at 60° C.

The composition may comprise about 0.1 wt. % or less of nalbuphine β epimer after storage for about 1 month at 25° C. and 60% relative humidity. In various embodiments, the composition may comprise about 0.1 wt. % or less, about 0.09 wt. % or less, about 0.08 wt. % or less, about 0.07 wt. % or less, about 0.06 wt. % or less, about 0.05 wt. % or less, about 0.04 wt. % or less, about 0.03 wt. % or less, about 0.02 wt. % or less, about 0.01 wt. % or less of nalbuphine β epimer after storage for about 1 month at 25° C. and 60% relative humidity.

The composition may comprise about 0.1 wt. % or less of nalbuphine β epimer after storage for about 3 months at 25° C. and 60% relative humidity. In various embodiments, the composition may comprise about 0.1 wt. % or less, about 0.09 wt. % or less, about 0.08 wt. % or less, about 0.07 wt. % or less, about 0.06 wt. % or less, about 0.05 wt. % or less, about 0.04 wt. % or less, about 0.03 wt. % or less, about 0.02 wt. % or less, about 0.01 wt. % or less of nalbuphine β epimer after storage for about 3 months at 25° C. and 60% relative humidity.

The composition may comprise about 0.1 wt. % or less of nalbuphine β epimer after storage for about 6 months at 25° C. and 60% relative humidity In various embodiments, the composition may comprise about 0.1 wt. % or less, about 0.09 wt. % or less, about 0.08 wt. % or less, about 0.07 wt. % or less, about 0.06 wt. % or less, about 0.05 wt. % or less, about 0.04 wt. % or less, about 0.03 wt. % or less, about 0.02 wt. % or less, about 0.01 wt. % or less of nalbuphine β epimer after storage for about 6 months at 25° C. and 60% relative humidity.

The composition may comprise about 0.1 wt. % or less of nalbuphine β epimer after storage for about 1 month at 40° C. and 75% relative humidity. In various embodiments, the composition may comprise about 0.1 wt. % or less, about 0.09 wt. % or less, about 0.08 wt. % or less, about 0.07 wt. % or less, about 0.06 wt. % or less, about 0.05 wt. % or less, about 0.04 wt. % or less, about 0.03 wt. % or less, about 0.02 wt. % or less, about 0.01 wt. % or less of nalbuphine β epimer after storage for about 1 month at 40° C. and 75% relative humidity.

The composition may comprise about 0.1 wt. % or less of nalbuphine β epimer after storage for about 3 months at 40° C. and 75% relative humidity. In various embodiments, the composition may comprise about 0.1 wt. % or less, about 0.09 wt. % or less, about 0.08 wt. % or less, about 0.07 wt. % or less, about 0.06 wt. % or less, about 0.05 wt. % or less, about 0.04 wt. % or less, about 0.03 wt. % or less, about 0.02 wt. % or less, about 0.01 wt. % or less of nalbuphine β epimer after storage for about 3 months at 40° C. and 75% relative humidity.

Generally, the composition may comprise about 0.1 wt. % or less of nalbuphine β epimer after storage for about 1 week or more at 60° C. In various embodiments, the composition may comprise about 0.1 wt. % or less, about 0.09 wt. % or less, about 0.08 wt. % or less, about 0.07 wt. % or less, about 0.06 wt. % or less, about 0.05 wt. % or less, about 0.04 wt. % or less, about 0.03 wt. % or less, about 0.02 wt. % or less, or about 0.01 wt. % or less of nalbuphine β epimer after storage for about 1 week or more at 60° C.

Generally, the composition may comprise about 0.1 wt. % or less of nalbuphine β epimer after storage for about 2 weeks or more at 60° C. In various embodiments, the composition may comprise about 0.1 wt. % or less, about 0.09 wt. % or less, about 0.08 wt. % or less, about 0.07 wt. % or less, about 0.06 wt. % or less, about 0.05 wt. % or less, about 0.04 wt. % or less, about 0.03 wt. % or less, about 0.02 wt. % or less, about 0.01 wt. % or less of nalbuphine β epimer after storage for about 2 weeks at 60° C.

The pharmaceutical composition has a high bioavailability. In general, the composition may have an absolute bioavailability from about 30% to about 70%. In various embodiments, the composition may have an absolute bioavailability of about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, or about 70%. In various embodiments, the composition may have an absolute bioavailability from about 30% to about 40%, about 30% to about 50%, about 30% to about 60%, about 30% to about 70%, about 40% to about 70%, about 50% to about 70%, or about 60% to about 70%. In some embodiments, the pharmaceutical composition may have an absolute bioavailability of greater than about 70%.

II. Concentrated Pharmaceutical Composition for Low Volume Intranasal Administration In yet another aspect, the present disclosure encompasses a concentrated pharmaceutical composition for low volume intranasal administration. The concentrated pharmaceutical composition comprises nalbuphine or a salt thereof and an acidifying agent selected from the group consisting of sulfuric acid, methanesulfonic acid, nitric acid, formic acid, acetic acid, phosphoric acid, tartaric acid, citric acid, succinic acid, malic acid, lactic acid, aspartic acid, galactaric acid, glucoheptonic acid, gluconic acid, glucuronic acid, glutamic acid, glutaric acid, glycolic acid, lactobionic acid, malonic acid, and combinations thereof, in an aqueous solution. The concentrated pharmaceutical composition may be any of the pharmaceutical compositions described in Section (I).

The concentrated pharmaceutical composition is suitable for intranasal administration to a patient in need thereof and may comprise from about 2.5 to about 40 mg of nalbuphine per 0.1 ml/nostril to 0.2 mL/nostril dose of the composition. In various embodiments, the concentrated pharmaceutical composition suitable for intranasal administration to a patient in need thereof and may comprise about 2.5 mg, about 3 mg, about 4 mg, about 5 mg, about 6 mg, about 7 mg, about 8 mg, about 9 mg, about 10 mg, about 11 mg, about 12 mg, about 13 mg, about 14 mg, about 15 mg, about 16 mg, about 17 mg, about 18 mg, about 19 mg, about 20 mg, about 21 mg, about 22 mg, about 23 mg, about 24 mg, about 25 mg, about 26 mg, about 27 mg, about 28 mg, about 29 mg, about 30 mg, about 31 mg, about 32 mg, about 33 mg, about 34 mg, about 35 mg, about 36 mg, about 37 mg, about 38 mg, about 39 mg, about 40 mg. In various embodiments, the concentrated pharmaceutical composition suitable for intranasal administration to a patient in need thereof and may comprise from about 5 mg to about 10 mg, about 10 mg to about 15 mg, about 15 mg to about 20 mg, about 20 mg to about 25 mg, about 25 mg to about 30 mg, about 20 mg to about 25 mg, about 35 mg to about 40 mg, about 5 mg to about 20 mg, about 5 mg to about 30 mg, about 5 mg to about 40 mg, about 10 mg to about 30 mg, about 10 mg to about 40 mg, about 20 mg to about 30 mg, about 20 mg to about 40 mg, or about 30 mg to about 40 mg of nalbuphine per 0.1 mL/nostril to 0.2 mL/nostril dose of the composition. In some embodiments, a dose of 0.2 mL per nostril of the composition may be effective for the treatment of pain management in an adult human patient in need thereof, such as 0.1 mL per nostril.

Generally, the absorption enhancer may have a concentration in the concentrated pharmaceutical composition from about 0.1 mg/mL to about 5 mg/mL, such as from about 0.1 mg/mL to about 0.5 mg/mL, about 0.1 mg/mL to about 1 mg/mL, about 0.1 mg/mL to about 2 mg/mL, about 0.1 to about 3 mg/mL, about 0.1 to about 4 mg/mL, about 0.1 to about 5 mg/mL, about 0.5 mg/mL to about 5 mg/mL, about 1 mg/mL to about 5 mg/mL, about 2 mg/mL to about 5 mg/mL, about 3 mg/mL to about 5 mg/mL, or about 4 mg/mL. In some embodiments, the absorption enhancer has a concentration in the pharmaceutical composition may be from 0.1 mg/mL±0.25 mg/mL to 0.5 mg/mL±0.25 mg/mL. In various embodiments, the concentration of the absorption enhancer may be 0.5 mg/mL±0.25 mg/mL, 0.4 mg/mL±0.25 mg/mL, 0.3 mg/mL±0.25 mg/mL, 0.2 mg/mL±0.25 mg/mL, or 0.1 mg/mL±0.25 mg/mL.

Preferably, the concentrated pharmaceutical composition may be suitable for administration to a patient in need thereof without reconstitution; i.e., the concentrated pharmaceutical composition may be suitable for intranasal administration to a subject in need thereof without the addition of water or another solvent.

Generally, a dose of the concentrated pharmaceutical for low volume administration may be effective for the treatment of pain management within 900 seconds or more. In various embodiments, the dose of the concentrated pharmaceutical for low volume administration may be effective for the treatment of pain management within about 900 seconds or more, within about 1000 seconds or more, within about 1100 seconds or more, within about 1200 seconds or more, within about 1300 seconds or more, within about 1400 seconds or more, or within about 1500 seconds or more. In various embodiments, the dose of the concentrated pharmaceutical for low volume administration may be effective for the treatment of pain management within about 900 seconds to about 1000 seconds, within about 1000 seconds to about 1100 seconds, within about 1100 seconds to about 1200 seconds, in within about 1200 seconds to about 1300 seconds, within about 1300 seconds to about 1400 seconds, within about 1400 seconds to about 1500 seconds, or more than 1500 seconds.

In other embodiments, the dose of the concentrated pharmaceutical for low volume administration may be effective for the treatment of pain management within about 900 seconds or less, within about 800 seconds or less, within about 700 seconds or less, within about 600 seconds or less, within about 500 seconds or less, within about 400 seconds or less, or within about 300 seconds or less.

III. Method of Treating Pain

In another aspect, the present disclosure encompasses a method of treating pain in a subject in need thereof. The method comprises administering a therapeutically effective amount of a pharmaceutical composition comprising nalbuphine or a salt thereof and an acidifying agent selected from the group consisting of sulfuric acid, methanesulfonic acid, nitric acid, formic acid, acetic acid, phosphoric acid, tartaric acid, citric acid, succinic acid, malic acid, lactic acid, aspartic acid, galactaric acid, glucoheptonic acid, gluconic acid, glucuronic acid, glutamic acid, glutaric acid, glycolic acid, lactobionic acid, malonic acid, and combinations thereof to the subject in need thereof. The pharmaceutical composition may be administered intranasally.

The pharmaceutical compositions comprising nalbuphine or a salt thereof and an acidifying agent may be any of the compositions described above in Sections (I) and (II).

The subject may be a human. The human may be a male or a female of various ages.

Intranasal administration may use a nasal spray container that emits a spray of the pharmaceutical composition as a mist, or the like.

Pharmacokinetics

After the pharmaceutical composition is administered intranasally, the following pharmacokinetic parameters may be demonstrated.

$C_{max}$ is the maximum (or peak) serum concentration that a drug achieves after the drug has been administered. Generally, the administration may result in a $C_{max}$ of nalbuphine from about 10 ng/mL to about 70 ng/mL. In various embodiments, the administration may result in a $C_{max}$ of nalbuphine of about 10 ng/mL, about 20 ng/mL, about 30 ng/mL, about 40 ng/mL, about 50 ng/mL, about 60 ng/mL, or about 70 ng/mL. In various embodiments, the administration may result in a $C_{max}$ of nalbuphine from about 10 ng/mL to about 20 ng/mL, about 20 ng/mL to about 30 ng/mL, about 30 ng/mL to about 40 ng/mL, about 40 ng/mL to about 50 ng/mL, about 50 ng/mL to about 60 ng/mL, or about 60 ng/mL to about 70 ng/mL.

$T_{max}$ is defined as the time to reach $C_{max}$. In general, the administration may result in a $T_{max}$ of nalbuphine from about 0.2 h to about 2 h. In various embodiments, the administration may result in a $T_{max}$ of nalbuphine of about 0.2 h, about 0.3 h, about 0.4 h, about 0.5 h, about 0.6 h, about 0.7 h, or about 0.8 h. In various embodiments, the administration may result in a $T_{max}$ of nalbuphine of from about 0.2 h to about 0.3 h, about 0.3 h to about 0.4 h, about 0.4 h to about 0.5 h, about 0.5 h to about 0.6 h, about 0.6 h to about 0.7 h, about 0.7 h to about 0.8 h, about 0.2 h to about 0.4 h, about 0.2 h to about 0.6 h, about 0.4 h to about 0.8 h, or about 0.6 h to about 0.8 h, about 0.8 h to about 1.2 h, about 1.2 h to about 1.6 h, about 1.6 h to about 2.0 h.

The half-life ($T_{1/2}$) is defined as the amount of time required for the drug concentration measured in plasma (or other biological matrices) to be reduced to exactly half of its starting concentration or amount. Generally, the administration may result in a $T_{1/2}$ of nalbuphine from about 2.0 h to about 3.0 h. In various embodiments, the administration may result in a $T_{1/2}$ of nalbuphine of about 2.0 h, about 2.1 h, about 2.2 h, about 2.3 h, about 2.4 h, about 2.5 h, about 2.6 h, about 2.7 h, about 2.8 h, about 2.9 h, or about 3.0 h. In various embodiments, the administration may result in a $T_{1/2}$ of nalbuphine of about 2.0 h to about 2.1 h, about 2.1 h to about 2.2 h, about 2.2 h to about 2.3 h, about 2.3 h to about 2.4 h, about 2.4 h to about 2.5 h, from about 2.5 h to about 2.6 h, from about 2.6 h to about 2.7 h, about 2.7 h to about 2.8 h, about 2.8 h to about 2.9 h, or about 2.9 h to about 3.0 h.

The $AUC_{0-inf}$ is the area under the plot of plasma concentration of a drug versus time after dosage (called "area under the curve" or AUC) which provides the extent of exposure to a drug and its clearance rate from the body. In general, the administration may result in a $AUC_{0-inf}$ of nalbuphine from about 80 ng·h/mL to about 200 ng·h/mL. In various embodiments, the administration results in a $AUC_{0-inf}$ of nalbuphine of about 80 ng·h/mL, about 90 ng·h/mL, about 100 ng·h/mL, about 110 ng·h/mL, about 120 ng·h/mL, about 130 ng·h/mL, about 140 ng·h/mL, about 150 ng·h/mL, about 160 ng·h/mL, about 170 ng·h/mL, about 180 ng·h/mL, about 190 ng·h/mL, or about 200 ng·h/mL. In various embodiments, the administration results in a $AUC_{0-inf}$ of nalbuphine of from about 80 ng·h/mL to about 90 ng·h/m, from about 90 ng·h/mL to about 100 ng·h/m, about 100 ng·h/mL to about 110 ng·h/m, about 110 ng·h/mL to about 120 ng·h/m, about 120 ng·h/mL to about 130 ng·h/m, about 130 ng·h/mL to about 140 ng·h/m, about 140 ng·h/mL to about 150 ng·h/m, about 150 ng·h/mL to about 160 ng·h/m, about 160 ng·h/mL to about 170 ng·h/m, about 170 ng·h/mL to about 180 ng·h/m, about 180 ng·h/mL to about 190 ng·h/m, or about 190 ng·h/mL to about 200 ng·h/m.

Spray Pattern

Spray patterns of the pharmaceutical compositions described herein may be characterized by the minimum ($D_{min}$) and maximum ($D_{max}$) spray diameters, and ovality ($D_{max}/D_{min}$). Those having ordinary skill in the art will appreciate that these parameters may be dependent on the type of spray pump used. Spray pumps suitable for intranasal administration of pharmaceutical compositions are generally well-known in the art. Accordingly, those having ordinary skill in the art will be capable of selecting a spray pump that achieves a desired spray pattern.

Generally, the pharmaceutical composition may have a spray pattern having a $D_{min}$ from about 5 mm to about 50 mm. In various embodiments, the pharmaceutical composition may have a minimum spray diameter spray pattern ($D_{min}$) of about 5 mm, about 10 mm, about 15 mm, about 20 mm, about 25 mm, about 30 mm, about 35 mm, about 40 mm, about 45 mm, or about 50 mm. In various embodiments, the pharmaceutical composition may have a minimum spray diameter spray pattern ($D_{min}$) of about 5 mm to about 10 mm, about 10 mm to about 15 mm, about 15 mm to about 20 mm, about 20 mm to about 25 mm, about 25 mm to about 30 mm, about 35 mm to about 40 mm, about 45 mm to about 50 mm, about 5 mm to about 10 mm, about 5 mm to about 20 mm, about 5 mm to about 30 mm, about 5 mm to about 40 mm, about 5 mm to about 50 mm, about 10 mm to about 50 mm, about 20 mm to about 50 mm, about 30 mm to about 50 mm, or about 40 mm to about 50 mm.

In general, the pharmaceutical composition may have a spray pattern having a $D_{max}$ from about 7 mm to about 75 mm. In various embodiments, the pharmaceutical composition may have a $D_{max}$ of about 7 mm, about 10 mm, about 15 mm, about 20 mm, about 25 mm, about 30 mm, about 35 mm, about 40 mm, about 45 mm, about 50 mm, about 55 mm, about 60 mm, about 65 mm, about 70 mm, or about 75 mm. In various embodiments, the pharmaceutical composition may have a $D_{max}$ from about 7 mm to about 10 mm, about 10 mm to about 15 mm, about 15 mm to about 20 mm, about 20 mm to about 25 mm, about 25 mm to about 30 mm, about 30 mm to about 35 mm, about 35 mm to about 40 mm, about 40 mm to about 50 mm, about 50 mm to about 55 mm, about 55 mm to about 60 mm, about 60 mm to about 65 mm, about 65 mm to about 70 mm, about 70 mm to about 75 mm, about 7 mm to about 25 mm, about 7 mm to about 35 mm, about 7 mm to about 45 mm, about 7 mm to about 55 mm, about 7 mm to about 65 mm, about 7 mm to about 75 mm, about 25 mm to about 75 mm, about 35 mm to about 75 mm, about 45 mm to about 75 mm, about 55 mm to about 75 mm, or about 65 mm to about 75 mm.

Generally, the pharmaceutical composition may exhibit a spray pattern having an ovality from about 1.00 to about 2.25. In various embodiments, the pharmaceutical composition may exhibit a spray pattern having an ovality of about 1.00, about 1.10, about 1.20, about 1.30, about 1.40, about 1.50, about 1.60, about 1.70, about 1.80, about 1.90, about 2.00, about 2.10, about 2.20, or about 2.25. In various embodiments, the pharmaceutical composition may exhibit a spray pattern having an ovality of from about 1.00 to about 1.10, about 1.00 to about 1.10, about 1.10 to about 1.20, about 1.20 to about 1.30, about 1.30 to about 1.40, about 1.40 to about 1.50, about 1.50 to about 1.60, about 1.60 to about 1.70, about 1.70 to about 1.80, about 1.80 to about 1.90, about 1.20 to about 2.00, about 2.00 to about 2.10, about 2.10 to about 2.20, or about 2.20 to about 2.25.

In general, the pharmaceutical composition exhibits a spray pattern having a spray angle from about 0° to about 45° compared to horizontal. In various embodiments, the pharmaceutical composition may exhibit a spray pattern having a spray angle of about 0°, about 5°, about 10°, about 15°, about 20°, about 25°, about 30°, about 35°, about 40°, or about 45°.

Shot Weight

The pharmaceutical composition may have a shot weight from about 25 mg to about 250 mg. Those having ordinary skill in the art will appreciate that the shot weight may be determined by selecting a spray pump capable of emitting a predetermined volume of the volumetric composition; i.e., a spray pump capable of emitting about 0.1 mL of a pharmaceutical composition may achieve a shot weight of about 100 mg. In various embodiments, the pharmaceutical composition may have a shot weight from about 25 mg to about 50 mg, about 25 mg to about 75 mg, about 25 mg to about 100 mg, about 25 mg to about 125 mg, about 25 mg to about 150 mg, about 25 mg to about 175 mg, about 25 mg to about 200 mg, about 25 mg to about 225 mg, about 25 mg to about 250 mg, about 50 mg to about 250 mg, about 75 mg to about 250 mg, about 100 mg to about 250 mg, about 125 mg to about 250 mg, about 150 mg to about 250 mg, about 175 to about 250 mg, about 200 mg to about 250 mg, or about 225 mg to about 250 mg. In some aspects, the pharmaceutical composition may have a shot weight of about 25 mg, 30 mg, 40 mg, 50 mg, 60 mg, 70 mg, 80 mg, 90 mg, 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, or about 250 mg. Preferably, the shot weight remains the same (i.e., within about 5%) of the shot weight of the pharmaceutical composition after about 1 week, 2 weeks, 4 weeks, 2 months, 3 months, or 6 months, or more than about 6 months.

IV. Method for Preparing a Concentrated Pharmaceutical Composition for Low Volume Intranasal Administration Yet another aspect of the present disclosure encompasses a method for preparing a concentrated pharmaceutical composition for low volume intranasal administration. The methods generally comprise: combining nalbuphine or a salt thereof and an acidifying agent to provide a highly concentrated solution; optionally adding benzalkonium chloride to the solution; and adjusting the pH of the solution. The methods are operable to produce any composition described in Sections (I) and (II) above.

Combining Nalbuphine or a Salt Thereof and an Acidifying Agent to Provide a Highly Concentrated Solution The method initiates by combining nalbuphine or a salt thereof and an acidifying agent. The nalbuphine or a salt thereof and the acidifying agent are combined in water to form a solution.

Nalbuphine or a salt thereof and the acidifying agent are described in more detail above in Section (I). An added amount of the acidifying agent may be added to later adjust the pH. Nalbuphine or a salt thereof and the acidifying agent may be added in any sequential order, in portions, or all at once.

The nalbuphine or a salt thereof and the acidifying agent may be mixed using various means known in the art such as magnetic stirring or mechanical stirring.

This step in the method may be conducted at a temperature that ranges from about 0° C. to about 50° C. In various embodiments, the temperature may range from about 0° C. to about 50° C., from about 10° C. to about 40° C., or from about 20° C. to about 30° C. In one embodiment, the combining may be conducted at temperature of about 23° C. (i.e., room temperature). The combining typically is performed under ambient pressure. The combining may also be conducted under an inert atmosphere, for example under nitrogen, carbon dioxide, argon, helium, or a combination thereof.

Generally, this combining step is allowed to proceed for a sufficient period of time until the solution is well-mixed and the nalbuphine or a salt thereof and the acidifying agent are well dissolved. Whether the nalbuphine and the acidifying agent are well dissolved may be determined visually. Those having ordinary skill in the art are capable of visually determining when the nalbuphine and the acidifying agent are well dissolved. The duration of the combining step may range from about 5 minutes to about 2 hours. In some embodiments, the duration of the combining may range from about 5 minutes to about 30 minutes, from about 30 minutes to about 1 hours, or from about 1 hour to about 2 hours.

Optionally Adding a Preservative to the Solution

The next step in the method is an optional step. This step comprises adding a preservative such as benzalkonium chloride to the solution of the nalbuphine or salt thereof and the acidifying agent formed in the previous step.

Benzalkonium chloride and other preservatives suitable for use in the present method are described in more detail above in Section (I).

Adjusting the pH of the Solution

The next step in the method comprises adjusting the pH of the solution to 3.0±0.5 to 7.5±0.5. In various embodiments, the pH may be adjusted to 3.0±0.5 to 4.0±0.5, 4.0±0.5 to 5.0±0.5, 5.0±0.5 to 6.0±0.5, 6.0±0.5 to 7.5±0.5, 3.0±0.5 to 5.0±0.5, 3.0±0.5 to 6.0±0.5, or 4.0±0.5 to 6.0±0.5.

In additional embodiments, the pH may be adjusted to 3.0±0.3 to 4.0±0.3, 4.0±0.3 to 5.0±0.3, 5.0±0.3 to 6.0±0.3, or 6.0±0.3 to 7.5±0.3, 3.0±0.3 to 5.0±0.3, 3.0±0.3 to 6.0±0.3, or 4.0±0.3 to 6.0±0.3.

The pH of the solution containing nalbuphine or salt thereof and the acidifying agent may have a pH of 7.5 or greater. Additional amounts of the acidifying agent may be added to reduce the pH into the desired range.

A list of suitable acidifying agents is described in more detail above in Section (I). The same acidifying agent or a different acidifying agent may be utilized. The acidifying agent is normally added in portions, the pH is measured, and additional acidifying agent is added until the nalbuphine is completely dissolved and a pH of 3.0 to 7.5±0.5 is obtained.

Any suitable instrument may be utilized to measure the pH may be utilized such as a calibrated pH meter (calibrated with a known buffer), pH strips, and the like.

This pH adjustment may be conducted at a temperature that ranges from about 0° C. to about 50° C. In various embodiments, the temperature of the pH adjustment may range from about 0° C. to about 50° C., from about 10° C. to about 40° C., or from about 20° C. to about 30° C. In one embodiment, the pH adjustment may be conducted at temperature of about 23° C. (i.e., room temperature). The reaction typically is performed under ambient pressure. The pH adjustment may also be conducted under an inert atmosphere, for example under nitrogen, argon, helium, or a combination thereof.

Optionally Adding a Pharmaceutically Acceptable Excipient(s)

Optionally, a pharmaceutically acceptable excipient may be added to the mixture. The pharmaceutically acceptable excipient may be added to the solution of the nalbuphine or a salt thereof and the acidifying agent before or after adding the benzalkonium chloride, or before or after the pH adjustment. The optional pharmaceutically acceptable excipient(s) may be added to the solution of the nalbuphine or a salt thereof and an acidifying agent or may be added to the solution nalbuphine or a salt thereof, an acidifying agent, and benzalkonium chloride. A list of pharmaceutically acceptable excipients is described in more detail in Section (I) above.

This addition of the pharmaceutically acceptable excipient adjustment may be added in portions or all at once.

The temperature for this addition may be conducted at a temperature that ranges from about 0° C. to about 50° C. In various embodiments, the temperature of the pH adjustment may range from about 0° C. to about 50° C., from about 10° C. to about 40° C., or from about 20° C. to about 30° C. In one embodiment, the pH adjustment may be conducted at temperature about 23° C. (i.e., room temperature). The reaction typically is performed under ambient pressure. The pH adjustment may also be conducted under an inert atmosphere, for example under nitrogen, argon, helium, or a combination thereof. The concentrated pharmaceutical composition for low volume intranasal administration may be stored at ambient temperature and, in some embodiments, under an inert atmosphere such as nitrogen.

EXAMPLES

The detailed description of the practices of this invention are demonstrated in, but not limited to, the following examples.

Materials

The following materials were used in the Examples. Nalbuphine was sourced from Yichang Humanwell with a 98.0%-102.0% assay and a β-epimer of ≤0.15%% and total impurity of ≤0.5% (excluding β-epimer). Concentrated hydrochloric acid, concentrated sulfuric acid, acetic acid, concentrated phosphoric acid, tartaric acid, citric acid monohydrate, lactic acid, succinic acid, and DL-malic acid were sourced from Sigma Aldrich, St. Louis, MO and used without further purification. Benzalkonium chloride, EDTA sodium, glycerin, methocel E4M, Polysorbate 80, and BHA were sourced from Sigma Aldrich, St. Louis, MO and used without further purification. Granisetron HCl was sourced from Fisher Scientific and used without further purification. The HPLC used was a Waters Alliance 2695 HPLC with 2998 PDA detector. The pH meter used to determine pH was a Mettler Toledo Seven Excellence benchtop pH/conductivity meter.

Example 1: Preparation of Highly Concentrated Nalbuphine Solution in Different Acids A preliminary assessment of Nalbuphine solubility in different acids was performed. Approximately 2 mmol Nalbuphine base was weighed and added to approximately 0.5 mmol/mL of each of the acids shown in Table 1 under stirring. After overnight continuous stirring, the suspensions were centrifuged, and supernatants were filtered through a 0.2 μm filter. After appropriate dilution of the filtrates, the final Nalbuphine concentrations were tested using HPLC, and Nalbuphine base solubility in different acids was calculated and listed in Table 1 below.

TABLE 1

Nalbuphine solubility in different acids.

| Acid | Nalbuphine base Solubility (mmol/mL) |
|---|---|
| Hydrochloride acid | 0.09 |
| Sulfuric acid | ~1.12 |
| Acetic acid | 0.42 |
| Phosphoric acid | 0.53 |
| Tartaric acid | 0.93 |
| Citric acid | 1.07 |
| Lactic acid | 0.46 |
| Succinic acid | 0.48 |
| DL-Malic acid | 0.63 |

Unexpectedly, the "thermodynamic" solubility screen showed that the addition of most acids allowed a rapid dissolution of Nalbuphine powder and achieved highly concentrated solutions, which could be diluted ad libitum with purified water or buffer for intranasal or other routes of administration. In particular, the solubility of nalbuphine in citric acid and sulfuric acid was highest at above 1 mmol/mL.

Example 2: Preparation of Citrate Salt of Nalbuphine Composition

Bulk pharmaceutical formulations were prepared as follows. 4.50 g citric acid monohydrate was added to approximate 60 mL Purified water and mixed well to achieve a clear and uniform solution. 18.15 g Nalbuphine base was slowly added to this acid solution and stirred until completely dissolved. 0.02 g Benzalkonium chloride (and, optionally, 0.40 g EDTA sodium, 2.00 g Glycerin, 0.01 g Methocel E4M and/or 0.05 g Polysorbate 80) was added and stirred until forming a uniform clear solution. The pH of the obtained solution was checked, and a quantity of sodium citrate or citric acid was added to adjust the pH of the solution to 5.5±0.5. The final solution volume adjusted up to 100 mL with purified water and the resulting solution was further mixed well. The solution was filtered through a 0.45 μm membrane. The final bulk solution was filled in a nasal spray device with nitrogen protection. Exemplary formulations P1-P7 were made using this method and are shown in Table 2 below.

TABLE 2

Nalbuphine formulations of citrate salt.

| Citrate Salt of Nalbuphine Formulations | | | P1 | P2 | P3 | P4 | P5 | P6 | P7 |
|---|---|---|---|---|---|---|---|---|---|
| Item# | Ingredient | Function | | | | mg/mL | | | |
| 1 | Nalbuphine base | API | 181.5 | 181.5 | 181.5 | 181.5 | 363.0 | 181.5 | 181.5 |
| 2 | Citric acid monohydrate | Acidifying agent | 45.0 | 45.0 | 45.0 | 45.0 | 90.0 | 45.0 | 45.0 |
| 3 | Benzalkonium chloride | Preservative | 0.2 | 0.2 | 0.2 | 0.2 | 0.2 | 0.2 | 0.2 |
| 4 | EDTA Sodium | Stabilizer | 4.0 | 4.0 | 4.0 | 4.0 | 4.0 | 4.0 | 4.0 |
| 5 | Glycerin | Cosolvent | 20.0 | — | 20.0 | — | 20.0 | 20.0 | 20.0 |
| 6 | Methocel E4M | Viscosity enhancer | 1.0 | — | — | 1.0 | 1.0 | 0.5 | 0.1 |
| 7 | Polysobate 80 | Surfactant, absorption enhancer | 0.5 | — | 0.5 | — | 0.5 | 0.5 | 0.5 |
| 8 | Purified water | Solvent | QS to 1 mL | QS to 1 mL | QS to 1 mL | QS to 1 mL | QS to 1 mL | QS to 1 mL | QS to 1 mL |
| | pH observed | | 5.6 | 5.6 | 5.6 | 5.6 | 5.6 | 5.6 | 5.6 |

Example 3: Preparation of Sulphate, Tartrate, and Malate Salts of Nalbuphine

Formulations P8-P10 were prepared by the same procedure described in Example 2 described above by measuring appropriate quantities of the reactants (nalbuphine base and the corresponding acid) and maintaining the proper pH. The compositions are described in Table 3 below.

TABLE 3

Sulphate, tartrate, and malate salt formulations of nalbuphine.

| Sulphate, Tartrate, Malate Salt of Nalbuphine Formulations | | | | mg/mL | |
|---|---|---|---|---|---|
| Item# | Ingredients | Function | P8 | P9 | P10 |
| 1 | Nalbuphine base | API | 181.5 | 181.5 | 181.5 |
| 2 | Sulfuric acid | Acidifying agent | 21.0 | — | — |
| 3 | Tartaric acid | Acidifying agent | — | 32.2 | — |
| 4 | Malic acid | Acidifying agent | — | — | 28.7 |
| 5 | Benzalkonium chloride | Preservative | 0.2 | 0.2 | 0.2 |
| 6 | EDTA Sodium | Stabilizer | 4.0 | 4.0 | 4.0 |
| 7 | Glycerin | Cosolvent | 20.0 | 20.0 | 20.0 |
| 8 | Methocel E4M | Viscosity enhancer | 0.1 | 0.1 | 0.1 |
| 9 | Polysorbate 80 | Surfactant, absorption enhancer | 0.5 | 0.5 | 0.5 |
| 10 | Purified water | Solvent | QS to 1 mL | QS to 1 mL | QS to 1 mL |

Example 4: Characterization of Nalbuphine Spray Formulations

Bulk solutions from Formulations P1 to P7 were filled in multiple-dose bottles (20 ml HDPE) and assembled with nasal spray pumps (multiple-dose, VP/7/25, 25 µL). Characterization studies including assay, impurity, pH, spray pattern/plume geometry, shot weight were tested. The impurities mostly included the nalbuphine β epimer; however, other unknown impurities were found in each of the formulations. The testing results are summarized in the Tables 4-5 below and in FIG. 1. The results showed that all formulations (P1 to P7) formed clear and stable solutions. Formulations with hydroxypropyl methylcellulose (Methocel E4M) level at 0.1 mg/mL to 0.5 mg/mL showed acceptable spray geometry (P2, P3, P6, P7).

TABLE 4

Assay, Impurity, and pH for Formulations P1-P7

| | | | Impurities | | |
|---|---|---|---|---|---|
| Formulation# | Initial Assay (%) | Nalbuphine β epimer (%) | Single maximum unknown impurity (%) | Total impurities (%) | pH |
| P1 | 105.6 | 0.01 | 0.044 | 0.15 | 5.6 |
| P2 | 105.7 | 0.01 | 0.045 | 0.15 | 5.6 |
| P3 | 105.9 | 0.01 | 0.044 | 0.15 | 5.6 |
| P4 | 104.5 | 0.01 | 0.043 | 0.15 | 5.5 |
| P5 | 97.8 | 0.01 | 0.043 | 0.15 | 5.6 |
| P6 | 100.7 | 0.01 | 0.040 | 0.16 | 5.6 |
| P7 | 103.0 | 0.01 | 0.040 | 0.15 | 5.5 |

TABLE 5

Spray Pattern and Plume Geometry for Formulations P1-P7

| | Spray pattern at 30 mm (SP30) | | | Spray pattern at 60 mm (SP60) | | | Spray angle (°) |
|---|---|---|---|---|---|---|---|
| Formulation# | $D_{min}$ (mm) | $D_{max}$ (mm) | Ovality | $D_{min}$ (mm) | $D_{max}$ (mm) | Ovality | |
| P1 | 11.24 | 12.06 | 1.07 | 20.91 | 22.98 | 1.10 | 19.8 |
| P2 | 27.42 | 32.96 | 1.20 | 45.41 | 67.79 | 1.50 | 34.9 |
| P3 | 25.46 | 29.73 | 1.17 | 40.28 | 48.42 | 1.20 | 30.1 |
| P4 | 11.05 | 12.72 | 1.15 | 21.54 | 25.85 | 1.20 | 13.6 |
| P5 | 5.78 | 9.68 | 1.67 | 7.93 | 16.02 | 2.02 | 3.2 |
| P6 | 13.63 | 14.66 | 1.08 | 23.57 | 26.55 | 1.13 | 20.5 |
| P7 | 20.96 | 26.60 | 1.27 | 26.98 | 38.56 | 1.43 | 29.8 |

Dmin: minimum cross-section diameter of the plume;
Dmax: maximum cross-section diameter of the plume;
Ovality = Dmax/Dmin;
Spray angle: the angle of the emitted plume measured from the vertex of the spray cone and spray nozzle.

Additionally, the change in shot weight of Formulation P7 was determined over 6 days as shown in Table 6. A 25 µL pump was used. The results show that a consistent spray was achieved was achieved over the six-day period.

TABLE 6

Shot Weight for Formulation P7

Shot weight (mg)

| Formulation# | P7 |
|---|---|
| Day 0 | 29.4 |
| Day 6 | 28.9 |

Example 5: Stability of Nalbuphine Formulations

Formulations P1-P6 were underwent stability tests at 60° C. without humidity control, 40° C./75% RH, and 25° C./60% RH. The formulations were stored for about 2 weeks. All the formulations were stable physically and chemically with slight discoloration (clear to light yellow at long term storage conditions) or no discoloration. The formulations were stored for six months. Stability data obtained for formulations P1-P6 were shown in the Tables 7a-9b below.

TABLE 7a

High Temperature Stability Data of Formulations P1-P6 at 60° C. (Week 1)

1 week 60° C.

| | | | Impurities | | |
|---|---|---|---|---|---|
| F# | Assay (%) | Nalbuphine β epimer (%) | Single maximum unknown impurity (%) | Total impurities (%) | pH |
| P1 | 94.9 | 0.01 | 0.12 | 0.37 | 5.5 |
| P2 | 99.8 | 0.01 | 0.11 | 0.35 | 5.5 |
| P3 | 99.6 | 0.01 | 0.11 | 0.34 | 5.6 |
| P4 | 95.6 | 0.01 | 0.15 | 0.42 | 5.4 |
| P5 | 88.8 | 0.01 | 0.07 | 0.34 | 5.5 |
| P6 | 91.9 | 0.01 | 0.13 | 0.38 | 5.3 |

TABLE 7b

High Temperature Stability Data of Formulations P1-P6 at 60° C. (Week 2)

2 weeks 60° C.

| | | | Impurities | | |
|---|---|---|---|---|---|
| F# | Assay (%) | Nalbuphine β epimer (%) | Single maximum unknown impurity (%) | Total impurities (%) | pH |
| P1 | 96.7 | 0.01 | 0.14 | 0.46 | 5.4 |
| P2 | 97.3 | 0.01 | 0.18 | 0.48 | 5.4 |
| P3 | 99.6 | 0.01 | 0.15 | 0.45 | 5.5 |
| P4 | 94.2 | 0.01 | 0.14 | 0.51 | 5.4 |
| P5 | 91.1 | 0.01 | 0.08 | 0.42 | 5.4 |
| P6 | 95.9 | NA | 0.02 | 0.50 | 5.3 |

TABLE 8a

Accelerated Stability Data of Formulations P1-P6 at 40° C./75% RH (1M)

1M, 40° C./75% RH

| | | | Impurities | | |
|---|---|---|---|---|---|
| F# | Assay (%) | Nalbuphine β epimer (%) | Single maximum unknown impurity (%) | Total impurities (%) | pH |
| P1 | 100.6 | NA* | 0.11 | 0.34 | 5.6 |
| P2 | 101.6 | NA | 0.11 | 0.35 | 5.5 |
| P3 | 101.1 | NA | 0.10 | 0.31 | 5.6 |
| P4 | 96.4 | NA | 0.11 | 0.35 | 5.6 |
| P5 | 91.0 | NA | 0.06 | 0.32 | 5.6 |
| P6 | 102.7 | NA | 0.10 | 0.33 | 5.6 |

*NA = undetectable

TABLE 8b

Accelerated Stability Data of Formulations P1-P6 at 40° C./75% RH (3M)

3M, 40° C./75% RH

| | | | Impurities | | |
|---|---|---|---|---|---|
| F# | Assay (%) | Nalbuphine β epimer (%) | Single maximum unknown impurity (%) | Total impurities (%) | pH |
| P1 | 100.5 | NA* | 0.18 | 0.53 | 5.6 |
| P2 | 102.1 | NA | 0.26 | 0.65 | 5.6 |
| P3 | 101.3 | NA | 0.23 | 0.61 | 5.6 |
| P4 | 99.0 | NA | 0.24 | 0.63 | 5.5 |
| P5 | 90.6 | NA | 0.12 | 0.43 | 5.5 |
| P6 | 98.2 | NA | 0.22 | 0.53 | 5.6 |

*NA = undetectable

TABLE 9a

Long-term Stability Data of Formulations P1-P6 at 25° C./60% RH (3M)

3M, 25° C./60% RH

| | | | Impurities | | |
|---|---|---|---|---|---|
| F# | Assay (%) | Nalbuphine β epimer (%) | Single maximum unknown impurity (%) | Total impurities (%) | pH |
| P1 | 102.8 | NA* | 0.047 | 0.18 | 5.5 |
| P2 | 101.5 | NA | 0.048 | 0.20 | 5.6 |
| P3 | 106.9 | NA | 0.047 | 0.20 | 5.6 |
| P4 | 101.5 | NA | 0.049 | 0.19 | 5.5 |
| P5 | 99.1 | NA | 0.047 | 0.21 | 5.5 |
| P6 | 98.7 | NA | 0.053 | 0.16 | 5.6 |

*NA = undetectable

TABLE 9b

Long-term Stability Data of Formulations P1-P6 at 25° C./60% RH (6M)

| | | 6M, 25° C./60% RH | | | |
|---|---|---|---|---|---|
| | | | Impurities | | |
| F# | Assay (%) | Nalbuphine ß epimer (%) | Single maximum unknown impurity (%) | Total impurities (%) | pH |
| P1 | 99.0 | NA* | 0.074 | 0.27 | 5.6 |
| P2 | 100.3 | NA | 0.073 | 0.26 | 5.6 |
| P3 | 99.9 | NA | 0.073 | 0.27 | 5.6 |
| P4 | 98.7 | NA | 0.080 | 0.28 | 5.6 |
| P5 | 90.2 | NA | 0.056 | 0.27 | 5.6 |
| P6 | 102.2 | NA | 0.053 | 0.27 | 5.6 |

NA = undetectable

Example 6: Stability of Nalbuphine Formulations with $N_2$ Purging

Formulations P11-P13 of nalbuphine were made according to the ingredients shown in Table 10 and according to the procedure described in Example 1. Formulations P11-P13 were filled in multiple-dose bottles with $N_2$ purging during filling. The filled samples underwent stability testing at 60° C. for 2 weeks, 40° C./75% RH for 3 months, and 25° C./60% RH for 6 months, and the stability data are shown in tables 11-14b below. With $N_2$ purging, formulation stability improved as compared to the formulations made without $N_2$ purging; i.e., impurity levels further decreased, and discoloration was mitigated.

TABLE 10

Nalbuphine Formulations of Citrate Salt made with $N_2$ Purging

| | Citrate Salt of Nalbuphine Formulations with $N_2$ purging | | P11 | P12 | P13 |
|---|---|---|---|---|---|
| Item# | Ingredients | Function | | mg/mL | |
| 1 | Nalbuphine base | API | 181.5 | 181.5 | 181.5 |
| 2 | Citric acid monohydrate | Acidifying agent | 45.0 | 45.0 | 45.0 |
| 3 | Benzalkonium chloride | Preservative | 0.2 | 0.2 | 0.2 |
| 4 | EDTA Sodium | Stabilizer | 4.0 | 4.0 | 4.0 |
| 5 | Glycerin | Cosolvent | 20.0 | 20.0 | — |
| 6 | Methocel E4M | Viscosity enhancer | 1.0 | 0.5 | — |
| 7 | Polysobate 80 | Surfactant, absorption enhancer | 0.5 | 0.5 | — |
| 8 | Purified water | Solvent | QS to 1 mL | QS to 1 mL | QS to 1 mL |
| pH observed | | | 5.6 | 5.6 | 5.6 |

TABLE 11

Assay, Impurity, and pH of Formulations P11-P13 (Initial)

| | | Initial | | | |
|---|---|---|---|---|---|
| | | | Impurities | | |
| Formulation# | Assay (%) | Nalbuphine ß epimer (%) | Single maximum unknown impurity (%) | Total impurities (%) | pH |
| P11 | 101.2 | 0.01 | 0.041 | 0.16 | 5.6 |
| P12 | 99.6 | 0.01 | 0.041 | 0.16 | 5.6 |
| P13 | 101.6 | 0.01 | 0.041 | 0.16 | 5.6 |

TABLE 12a

High Temperature Stability of Formulations P11-P13 at 60° C. (1 week)

| | | 1 week 60° C. | | | |
|---|---|---|---|---|---|
| | | | Impurities | | |
| F# | Assay (%) | Nalbuphine ß epimer (%) | Single maximum unknown impurity (%) | Total impurities (%) | pH |
| P11 | 89.7 | 0.01 | 0.044 | 0.26 | 5.3 |
| P12 | 91.2 | 0.01 | 0.043 | 0.24 | 5.3 |
| P13 | 94.9 | 0.01 | 0.044 | 0.28 | 5.3 |

TABLE 12b

High Temperature Stability of Formulations P11-P13 at 60° C. (2 weeks)

| | | 2 weeks 60° C. | | | |
|---|---|---|---|---|---|
| | | | Impurities | | |
| F# | Assay (%) | Nalbuphine ß epimer (%) | Single maximum unknown impurity (%) | Total impurities (%) | pH |
| P11 | 96.5 | NA | 0.046 | 0.25 | 5.3 |
| P12 | 95.3 | NA | 0.046 | 0.26 | 5.4 |
| P13 | 102.7 | NA | 0.046 | 0.25 | 5.5 |

TABLE 13a

Accelerated Stability Data of Formulations P11-P13 at 40° C./75% RH (1M)

| | | 1M, 40° C./75% RH | | | |
|---|---|---|---|---|---|
| | | | Impurities | | |
| F# | Assay (%) | Nalbuphine ß epimer (%) | Single maximum unknown impurity (%) | Total impurities (%) | pH |
| P11 | 102.3 | NA | 0.046 | 0.23 | 5.6 |
| P12 | 99.8 | NA | 0.046 | 0.22 | 5.6 |
| P13 | 102.6 | NA | 0.048 | 0.24 | 5.6 |

TABLE 13b

Accelerated Stability Data of Formulations P11-P13 at 40° C./75% RH (3M)

| | | 3M, 40 ° C./75% RH | | |
|---|---|---|---|---|
| | | Impurities | | |
| F# | Assay (%) | Nalbuphine ß epimer (%) | Single maximum unknown impurity (%) | Total impurities (%) | pH |
| P11 | 101.2 | NA | 0.034 | 0.17 | 5.6 |
| P12 | 98.6 | NA | 0.037 | 0.17 | 5.6 |
| P13 | 100.8 | NA | 0.068 | 0.22 | 5.6 |

TABLE 14a

Long-term Stability Data of Formulations P11-P13 at 25° C./60% RH (3M)

| | | 3M, 25° C./60% RH | | |
|---|---|---|---|---|
| | | Impurities | | |
| F# | Assay (%) | Nalbuphine ß epimer (%) | Single maximum unknown impurity (%) | Total impurities (%) | pH |
| P11 | 98.9 | NA | 0.033 | 0.14 | 5.6 |
| P12 | 98.2 | NA | 0.031 | 0.14 | 5.6 |
| P13 | 101.2 | NA | 0.036 | 0.15 | 5.6 |

TABLE 14b

Long-term Stability Data of Formulations P11-P13 at 25° C./60% RH (6M)

| | | 6M, 25° C./60% RH | | |
|---|---|---|---|---|
| | | Impurities | | |
| F# | Assay (%) | Nalbuphine ß epimer (%) | Single maximum unknown impurity (%) | Total impurities (%) | pH |
| P11 | 101.9 | NA | 0.048 | 0.18 | 5.6 |
| P12 | 99.6 | NA | 0.031 | 0.19 | 5.6 |
| P13 | 104.9 | NA | 0.036 | 0.22 | 5.6 |

Example 7: Nalbuphine Formulations with Lower pH

Figure 2:
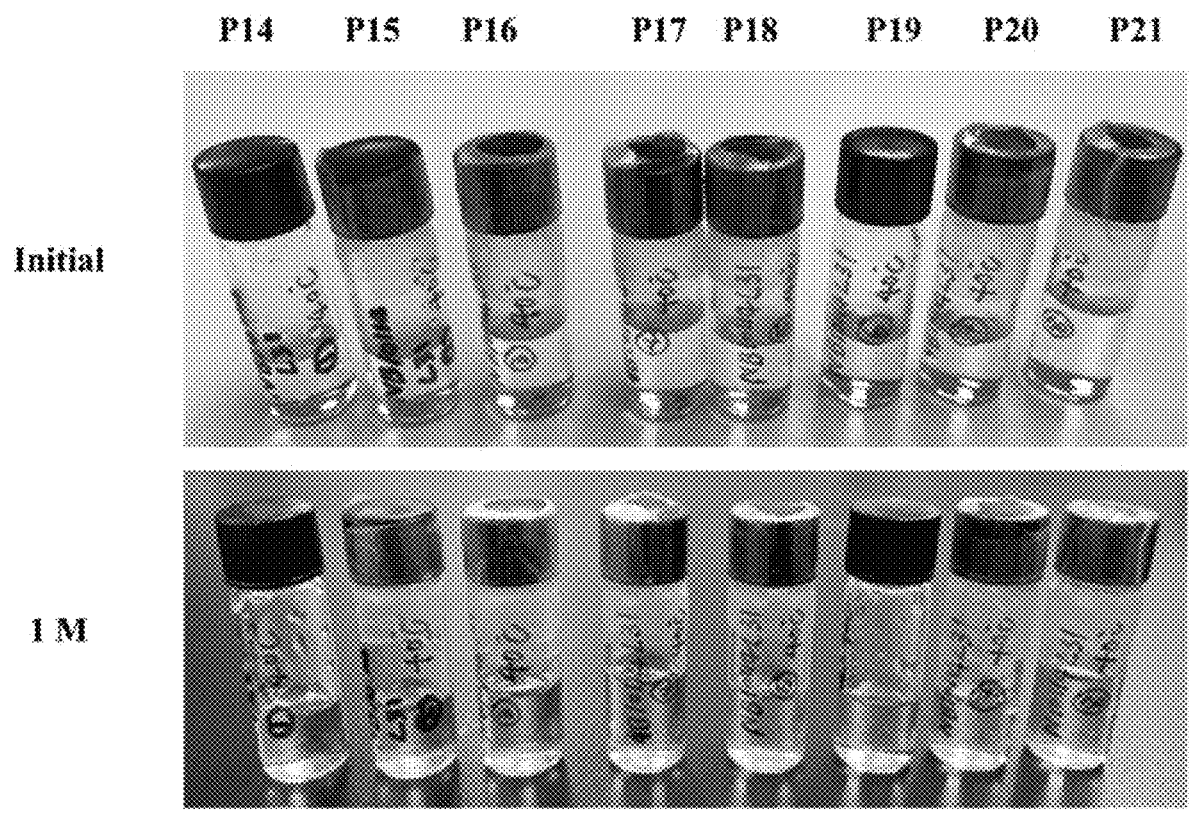
FIG. 2 shows the color change of exemplary formulations of the present disclosure after one month of storage.

Bulk solutions of formulations of P14 to P21 (Table 15) were prepared by the same procedure as described in Example 2. Bulk solutions from formulations P14 to P21 were filled in multiple-dose bottles with or without $N_2$ purging during filling. Shot weight of formulations P17 and P18 were tested, and results are shown in Table 16 below. The filled samples underwent stability testing at accelerated conditions (40° C./75% RH) for 1 month. It was found that lower pH (~3.5) further improved solution discoloration, as shown in FIG. 2.

TABLE 15

Nalbuphine Formulations of Citrate Salt made with or without $N_2$ Purging at pH 3.5 and at pH 5.4

| Item# | Ingredients | Function | P14 | P15 | P16 | P17 | P18 | P19 | P20 | P21 |
|---|---|---|---|---|---|---|---|---|---|---|
| | | | | | | mg/mL | | | | |
| 1 | Nalbuphine base | API | 181.5 | 181.5 | 181.5 | 181.5 | 181.5 | 181.5 | 181.5 | 181.5 |
| 2 | Citric acid monohydrate | Acidifying agent | 106.7 | 106.7 | 106.7 | 106.7 | 106.7 | 45.0 | 45.0 | 45.0 |
| 3 | Benzalkonium chloride | Preservative | — | — | 0.2 | 0.2 | 0.2 | — | — | 0.2 |
| 4 | EDTA Sodium | Stabilizer | — | — | — | 4.0 | 4.0 | — | — | 4.0 |
| 5 | BHA | Anti-oxidant | — | — | — | — | 0.2 | — | — | — |
| 6 | Glycerin | Cosolvent | — | — | — | — | 10.0 | — | — | — |
| 7 | Methocel E4M | Viscosity enhancer | — | — | — | — | 0.1 | — | — | — |
| 8 | Polysobate 80 | Surfactant, absorption enhancer | — | — | — | — | 0.5 | — | — | — |
| 9 | Purified water | Solvent | QS to 1 ml | QS to 1 ml | QS to 1 ml | QS to 1 ml | QS to 1 ml | QS to 1 ml | QS to 1 ml | QS to 1 ml |
| 10 | N2 purge (Y/N) | | N | Y | Y | Y | N | Y | Y | Y |
| | pH | | | | ~3.5 | | | | ~5.4 | |

TABLE 16

Shot Weight of Formulations P17 and P18

| | Shot weight (mg) | | |
|---|---|---|---|
| Formulation# | P17 | P18 | Water |
| Day 0 | 29.3 | 29.1 | 24.1 |
| Day 6 | 29.3 | 28.7 | 25.6 |

Example 8: Nalbuphine Formulations Combined with Anti-Emetic Drugs

A bulk solution of formulation P22 (Table 17) was prepared by the same procedure as described in Example 2 except Granisetron HCl was further added. A bulk solution of P22 was filled in multiple-dose bottle. The shot weight of P22 was tested, and results are shown in Table 18 below.

TABLE 17

Nalbuphine and Anti-Emetic drug (Granisetron HCl) Combined Formulation

| | Combination formulation | | P14 |
|---|---|---|---|
| Item# | Ingredients | Function | mg/mL |
| 1 | Nalbuphine base | API | 181.5 |
| 2 | Granisetron HCl | API | 11.2 |
| 3 | Citric acid monohydrate | Acidifying agent | 106.7 |
| 4 | EDTA Sodium | Stabilizer | 4.0 |
| 5 | Glycerin | Cosolvent | 20.0 |
| 6 | Methocel E4M | Viscosity enhancer | 0.1 |
| 7 | Polysobate 80 | Surfactant, absorption enhancer | 0.5 |
| 8 | Purified water | Solvent | QS to 1 ml |

TABLE 18

Shot Weight of Formulation P22

| Time | Shot weight (mg) |
|---|---|
| Day 0 | 32.6 |
| Day 3 | 31.9 |
| Day 12 | 30.7 |
| Day 18 | 32 |

Example 9: Animal Pharmacokinetic Study

A bioavailability comparison study of Nalbuphine Nasal Spray formulations (Formulations P2 and P7 described above) at a dose of 9 mg Nalbuphine versus an intravenous injection at a dose of 9 mg Nalbuphine was conducted on beagle dogs. The study was a randomized single-dose, three-period crossover study including 2 nasal spray formulations (P2 and P7) and 1 commercially available intravenous injection formulation. A total of 3 healthy, male Beagle dogs weighing from 9.55 kg to 9.79 kg, were included in the study. The dogs were randomly allocated to a 3-period crossover design by the principal investigator using a randomization program. Two routes of administration of Nalbuphine were studied: the intranasal route (IN) and the intravenous route (IV).

Following a 3-day wash-out period, each dog underwent the same protocol but received Nalbuphine through a different administration route. For the IV administration, a commercially available IV injection solution (10 mg/mL Nalbupine HCl, equivalent to 9.074 mg/ml Nalbuphine base) was used. IV nalbuphine was administered at a dose of 0.9074 mg/kg body weight (Nalbuphine base) through a catheter. For the nasal spray, conscious dogs (no anesthesia/sedation) were restrained by a technician, while a second technician delivered one spray (50 μL of 181.5 mg/mL, after 3 actuations of prime) of Nalbuphine solution (P2 or P7) into the dog's nose at a dose of 9.075 mg/dog. The entire dose was delivered at a depth of approximately three-quarters of an inch into one nostril. The head of each dog was held extended at approximately a 30° angle from horizontal direction for 1 minute after spray to prevent nasal runoff of sprayed solution from the nares.

Figure 3:
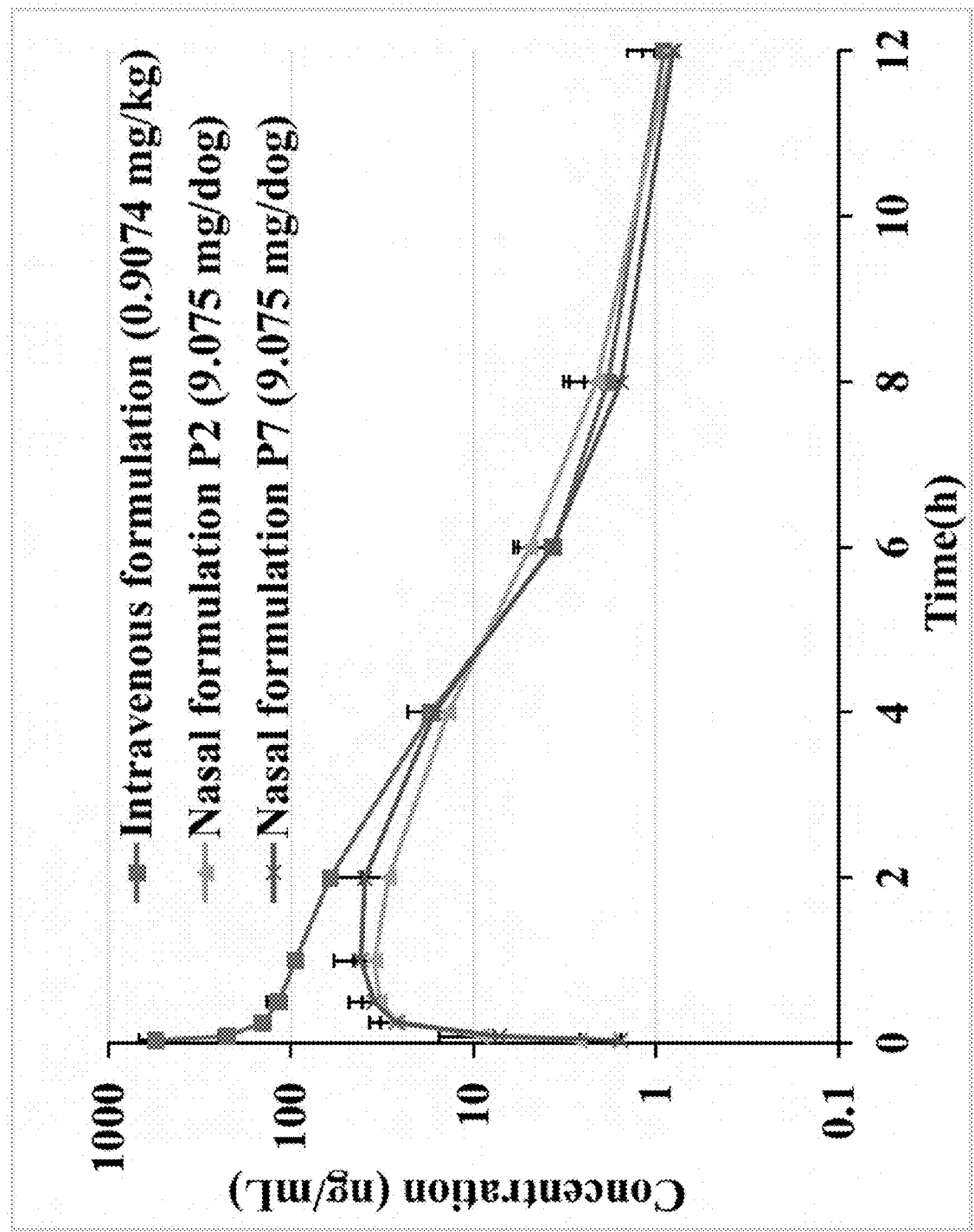
FIG. 3 shows the serum concentration of nalbuphine over time from an IV formulation and from two exemplary nasal spray formulations of the present disclosure.

After drug administration (IV or IN), all observations were recorded and blood samples were collected for all dogs at baseline (immediately prior to Nalbuphine administration) and after Nalbuphine administration (at 2, 5, 15, and 30 minutes and 1, 2, 4, 6, 8, and 12 hours) for each treatment. The blood samples were immediately transferred to a tube containing ethylenediaminetetraacetic acid ($K_2EDTA$) and the plasma was immediately separated by centrifugation at 3,200 rpm for 10 min at 2-8° C. The plasma was then stored at −60° C. until analysis. Plasma nalbuphine concentrations were determined by LC-MS/MS. The pharmacokinetic parameters were obtained from the individual plasma concentration-time profiles of nalbuphine in each animal, by non-compartmental analysis using WinNonLin® software (version 6.3 Pharsight Corporation). Mean nalbuphine plasma concentration versus time curves for each administration route are displayed in FIG. 3. Pharmacokinetic results are shown in Table 19. No significant differences in pharmacokinetic parameters were found between the two nasal spray formulations of P2 and P7 with absolute bioavailability of 39.1% and 44.8%, respectively.

TABLE 19

Pharmacokinetic Parameters of Nalbuphine in Dogs Administered a Single Dose of 0.9074 mg/kg BW intravenously (IV) or 9.075 mg/dog intranasally (IN) (n = 3, mean ± SD)

| | Route of administration | | |
|---|---|---|---|
| PK Parameters | IV | IN (P2) | IN (P7) |
| $C_{max}$ (ng/mL) | 1028 | 36 | 41.7 |
| $T_{max}$ (h) | — | 0.833 | 1.33 |
| $T_{1/2}$ (h) | 1.86 | 2.17 | 2.42 |
| $AUC_{0-last}$ (ng · h/mL) | 332 | 130 | 150 |
| $AUC_{0-inf}$ (ng · h/mL) | 335 | 132 | 152 |
| Bioavailability (%) | — | 39.1 | 44.8 |

What is claimed is:

1. A pharmaceutical composition for intranasal administration comprising: (i) about 5.0% w/v to about 40% w/v of nalbuphine base (ii) about 0.1M (mol/L) to about 5M of an acidifying agent selected from the group consisting of sulfuric acid, tartaric acid, citric acid, malic acid, and combinations thereof; (iii) water; and
a mole ratio of acidifying agent to nalbuphine base of about 0.1:1 to about 10:1
wherein the composition is a solution with the nalbuphine base completely dissolved.

2. The pharmaceutical composition of claim 1, further comprising a pharmaceutically acceptable excipient selected from the group consisting of a preservative, a stabilizer, a cosolvent, a viscosity enhancer, a surfactant, an absorption enhancer, a solvent, and combinations thereof.

3. The pharmaceutical composition of claim 2, wherein the composition comprises a stabilizer comprising EDTA sodium.

4. The pharmaceutical composition of claim 3, wherein the stabilizer has a concentration from about 0.005% w/v to about 5% w/v.

5. The pharmaceutical composition of claim 1, wherein the nalbuphine base has a concentration from about 5.0% w/v to about 30.0% w/v.

6. The pharmaceutical composition of claim 1, wherein the composition has a pH from about 3.0 to about 7.5.

7. The pharmaceutical composition of claim 1, wherein the composition comprises about 1.0 wt. % or less of nalbuphine β epimer.

8. The pharmaceutical composition of claim 1, wherein the composition comprises about 1.0 wt. % or less of total impurities.

9. The pharmaceutical composition of claim 1, wherein the composition comprises about 0.5 wt. % or less of total impurities after storage for 3 months at 25° C. and 60% relative humidity.

10. The pharmaceutical composition of claim 1, wherein the composition comprises about 0.5 wt. % or less of total impurities after storage for 1 month at 40° C. and 75% relative humidity.

11. The pharmaceutical composition of claim 1, wherein the composition comprises about 0.5 wt. % or less of total impurities after storage for 3 months at 40° C. and 75% relative humidity.

12. The pharmaceutical composition of claim 1, wherein the composition comprises about 0.1 wt. % or less of nalbuphine β epimer after storage for 3 months at 25° C. and 60% relative humidity.

13. The pharmaceutical composition of claim 1, wherein the composition comprises about 0.1 wt % or less of nalbuphine β epimer after storage for 6 months at 25° C. and 60% relative humidity.

14. The pharmaceutical composition of claim 1, wherein the composition comprises about 0.1 wt. % or less of nalbuphine β epimer after storage for 1 month at 40° C. and 75% relative humidity.

15. The pharmaceutical composition of claim 1, wherein the composition comprises about 0.1 wt. % or less of nalbuphine β epimer after storage for 3 months at 40° C. and 75% relative humidity.

16. The pharmaceutical composition of claim 1, wherein the composition has an absolute bioavailability from about 30% to about 70%.

17. The pharmaceutical composition of claim 1, further comprising an antiemetic agent.

18. The pharmaceutical composition of claim 17, wherein the antiemetic agent comprises granisetron, palonosetron, ondansetron, or a salt thereof.

19. The pharmaceutical composition of claim 17, wherein the antiemetic agent has a concentration in the pharmaceutical composition from about 0.10 mg/mL to about 100 mg/mL.

20. The pharmaceutical composition of claim 1 wherein composition comprises (i) about 5.0% w/v to about 30.0% w/v of nalbuphine base, (ii) about 0.1M to about 2.0M of the acidifying agent is selected from the group consisting of sulfuric acid, tartaric acid, citric acid, malic acid, and a mole ratio of acidifying agent to nalbuphine base of about 0.1:1 to about 3:1.

* * * * *